(12) United States Patent
Vogt

(10) Patent No.: US 7,943,889 B2
(45) Date of Patent: May 17, 2011

(54) APPARATUS FOR IMPROVING DETECTION EFFICIENCY OF MULTIPHOTON MICROSCOPY SYSTEMS BY FOCUS COMPENSATION, PUPIL IMAGE DIVISION, AND PARALLEL PUPIL REARRANGEMENT

(75) Inventor: William I. Vogt, Baraboo, WI (US)

(73) Assignee: Prairie Technologies, Inc., Middleton, WI (US)

( * ) Notice: Subject to any disclaimer, the term of this patent is extended or adjusted under 35 U.S.C. 154(b) by 307 days.

(21) Appl. No.: 12/052,766

(22) Filed: Mar. 21, 2008

(65) Prior Publication Data

US 2009/0236549 A1 Sep. 24, 2009

(51) Int. Cl.
*H01J 3/14* (2006.01)
(52) U.S. Cl. ............. 250/204; 250/578.1; 359/385; 359/389
(58) Field of Classification Search ........... 250/204, 250/216, 578, 201.3, 578.1; 359/385, 389
See application file for complete search history.

(56) References Cited

U.S. PATENT DOCUMENTS

| 4,076,420 | A * | 2/1978 | De Maeyer et al. ............ 356/73 |
| 5,051,585 | A * | 9/1991 | Koshishiba et al. ............. 850/9 |
| 5,304,801 | A * | 4/1994 | Arai ............................. 250/311 |
| 6,712,349 | B2 * | 3/2004 | Watanabe ...................... 270/37 |
| 6,801,315 | B2 * | 10/2004 | Finarov et al. ................ 356/401 |
| 6,875,973 | B2 * | 4/2005 | Ortyn et al. ................ 250/201.3 |
| 2007/0057211 | A1 * | 3/2007 | Bahlman et al. ............. 250/584 |

* cited by examiner

*Primary Examiner* — Georgia Y Epps
*Assistant Examiner* — Kevin Wyatt
(74) *Attorney, Agent, or Firm* — Joseph T. Leone, Esq.; DeWitt Ross & Stevens S.C.

(57) ABSTRACT

Disclosed is an apparatus for division and rearrangement of light from a source object. The apparatus splits the light from the source object, or image of the source object, and recombines it in a parallel, fashion to increase the efficiency of multiphoton microscopy in general and harmonic or fluorescence emission microscopy in particular. The apparatus includes a beam splitter configured to split a light beam into at least two independent light paths to yield a first light path and a second light path; a first beam focuser configured to direct and focus the first light path onto a focal plane; and a second beam focuser configured to direct and focus the second light path onto the same or different focal plane to which the first light path is focused; and wherein the first and second light paths may be superimposed upon one another at a common focal plane or directed independently to different positions.

10 Claims, 21 Drawing Sheets

| Parts List | | |
|---|---|---|
| ITEM | NAME | |
| 48 | LARGE APERTURE OBJECTIVE LENS | |
| 49 | ASPHERIC LENSES | |
| 50 | PMT ENVELOPE CROSS SECTION | |
| 51 | PMT PHOTOCATHODE | |
| 52 | PMT PHOTOCATHODE WIDTH INDICATION | |
| 53 | OVERFILL & GRAZING SIGNAL LIGHT | |
| 54 | IDEAL ACCEPTANCE CONE 12-16 DEG | |
| 55 | STEEP ANGLE SIGNAL LIGHT PATHS | |

Hamamatsu R3896 photomultiplier tube photocathode dimensions and sensitivity profile

APPARATUS FOR IMPROVING DETECTION EFFICIENCY OF MULTIPHOTON MICROSCOPY SYSTEMS BY FOCUS COMPENSATION, PUPIL IMAGE DIVISION, AND PARALLEL PUPIL REARRANGEMENT

BACKGROUND

In multiphoton microscopy, a beam of excitation light (usually pulsed infrared (IR) laser light) is brought to a focus within a specimen. Localized harmonic emission and/or multiphoton excited fluorescent emission is produced at this focus. Because of the non-linear dependency on flux intensity involved in these processes, the emitted light generated is highly localized at the point of focus and thus provides distinct information from only that point and none from the adjacent volume. In the case of two-photon fluorescent emission this signal light is approximately half the wavelength (twice the frequency) of the excitation beam. With $2^{nd}$ and $3^{rd}$ harmonic generation the wavelength of the signal light is exactly half or a third of the excitation wavelength. The microscopy system additionally includes a means of collecting this emitted light and projecting it onto any of a variety of photodetectors. The entire device is thus a very sensitive and spatially selective probe and detection system. Most commonly these systems also include a mechanism, such as galvanometer-controlled mirrors, to scan the focus point of excitation sequentially within the sample. Usually this motion is in the pattern of a raster scan in the x-y plane but may also include displacement along the z-axis. Using a programmable computer to combine this sequential stream of intensity measurements with the known x-y-z coordinates of the scan mechanism, a two- or three-dimensional intensity map of the specimen is created.

Conventionally, the preferred mechanism for focusing the excitation light to a point as described in the previous paragraph has been the microscope objective lens. This lens also serves as the primary "collector" of the emitted signal light. In addition, a standard microscope condenser lens or objective lens is often used behind the specimen to collect emitted signal light traveling away from the objective lens. This light can be detected separately and electronically summed with the signal light collected through the first objective lens to increase overall signal capture. For both collection pathways the conventional method of bringing the signal light to impinge on the photodetector has included some device to separate the emitted signal light from the excitation light. This can be done with a dichroic mirror for instance, a device that is spectrally selective in reflection and transmission. Additionally, some means of concentrating the signal light onto the photodetector active area is required. This is conventionally accomplished using one or more optical lens elements which collect the diverging cone of signal light from the objective lens pupil and re-image it onto the photodetector.

In a multiphoton scanning microscopy system the characteristics of the objective lens are the determining and limiting factor as to the accessible field of view and resolving capability of the entire system. The field of view is a function of the scanning system coupled with the magnification (power) of the objective lens. Lenses of lower power yield proportionally larger fields of view. The fine detail resolving power is a function of the numerical aperture (NA) of the objective lens. NA is a dimensionless number that characterizes the range of angles over which the lens can accept or emit light. The size of the finest detail that can be resolved with an objective lens is proportional to $\lambda/NA$, where $\lambda$ is the wavelength of the excitation light. Thus, an objective lens of greater NA is capable of visualizing finer details than a lens of lower NA. Because of their greater acceptance angle, lenses of greater NA are also able to collect more of the signal light generated within the sample, thereby improving the sensitivity of the system. In addition to the collection efficiency of high NA lenses, a lens of lower power (i.e., wider field of view) is capable of capturing a relatively greater proportion of signal light when imaging at depth in a turbid medium.

An optical principle inherent in objective lens design is that for a given NA, the pupil diameter of the lens will vary inversely with the magnification of the objective lens. For many years, objective lens designs have evolved based upon combinations of parameters that have, for the most part, resulted in objective lens pupil diameters in the range of from about 4 mm up to about 12 mm. Most conventional multiphoton systems use objective lenses with pupil diameters in the 5 to 8 mm range. In response to an increasing interest in wider fields of view while maintaining maximum resolution, several advanced biological objective lens designs have recently been brought to the market by the major microscope manufacturers. These new objective lenses are attractive because of their combination of low magnification and high NA. These lenses, however, have pupil diameters of 16 to 17 mm and greater. Even lower power lenses (with yet larger pupils) are under development to increase further the accessible field of view.

Multiphoton imaging inherently involves very low signal return from the sample. This is especially true of biological multiphoton imaging where photodamage to the sample (caused by excessive excitation dose) is always a paramount concern. It is also a well know principle that undesirable spurious noise and dark current (current flow that is not a product of signal light) within photodetectors varies in proportion to the size of the active area of the detector. Thus, in low signal-to-noise situations (which is always the case in multiphoton imaging), there is an advantage in reducing the size of the photodetector to a practical minimum because it reduces the amount of spurious noise and dark current. Many of the best photodetectors, in terms of sensitivity, speed, and low noise, have active areas of only a few square millimeters. Additionally, photodetectors such as photomultiplier tubes have active area sensitivity profiles that rise to a peak only in an area considerably smaller than the specified full active area. With the advent and implementation of large-pupil objective lenses (and equally so with condenser lenses) an inescapable geometric difficulty arises when attempting to transfer light from a relatively large objective pupil to a relatively small photodetector active area.

A conventional, prior art multiphoton detection and scan system is illustrated schematically in FIG. 1. Here excitation light from the illumination source 1 is directed into a scanning galvanometer mechanism 2 which imparts the typical raster pattern scanning of the focused spot at the sample. The scanning beam travels through a scan lens 3, reflects off a turning mirror 5, passes through a tube lens 6, passes through a dichroic beam splitter 18, and enters the objective pupil 7. The objective lens 8 focuses the excitation light on the sample placed at sample plane 9. Signal light which may be of a wavelength different from the excitation is emitted from the specimen. A portion of the signal light which radiates upward is collected by the objective lens 8, reflects off the spectrally selective dichroic 18, passes through lens 19, and arrives at the photodetector 20 where it is converted into an electrical signal. The lens 19 and photodetector 20 together define a non-descanned detector 21. A portion of the signal light which radiates downward is collected by the condenser lens (or objective lens) 48 and passes through objective lens 49 having diameter 50, reflects off the mirror or beam splitting device 52, passes through lens 53, and arrives at the photo-detector 54 where it is converted into an electrical signal. Lens 53 and the photodetector 54 together define a transmission non-descanned detector 51.

FIG. 2 illustrates a simplification of either of the prior art detection pathways of the conventional multiphoton system of FIG. 1. The light rays shown represent signal light from the sample (at plane 9) being relayed through the optical system (objective lens 8 having entrance/exit 7 and diameter 11, and focusing lens 19) to the photodetector 20. Here lens 19 is used to collect the signal light exiting the objective pupil with a diameter 11. In accord with basic optical principles, lens 19 forms an image 45 of the objective pupil 11 at the photodetector 20. This pupil image 45 at the photodetector 20 will have a diameter equal to the objective lens pupil diameter multiplied by the ratio L2/L1.

FIG. 3 illustrates the same detection path shown in FIG. 2, but with an objective lens 8 that has a pupil diameter 11 twice as large as the corresponding pupil diameter in FIG. 2. As in FIG. 2, lens 19 relays the light from the objective lens pupil plane 7 to the photodetector 20 where it now forms an image 45 having a diameter twice as large as the corresponding image produced in FIG. 2. The problem at hand is easily perceived: When the photodetector 20 in FIGS. 2 and 3 is optimized for a microscope dimensioned as in FIG. 2, that same photodetector is not optimized for a microscope dimensioned as in FIG. 3. In the device shown in FIG. 3, the larger pupil image overfills the detector active area and a significant portion of the signal is wasted. Assuming a uniform intensity across the pupil cross-section, the portion of signal lost in this case is ~75% (based on a comparison of areas). This loss of signal is a fundamental problem when using low-power, high NA objective lenses.

FIG. 4 illustrates an additional aspect of wide-field signal collection and transfer to a photodetector that has relevance to the invention disclosed herein. The optical system depicted in FIG. 4 is the same as depicted in FIG. 3. However, in FIG. 4, a sample 46 with considerable light scattering properties is illustrated. Scattering within the sample adds randomness to the signal light before it is collected by the objective lens 8. This results in a wider emission cone 47 of signal light after the signal passes through the objective lens entrance/exit plane 7 as it travels toward the focusing lens 19. To maintain maximum detection efficiency, the focusing lens 19 must be enlarged (as shown by the dotted line around lens 19) to capture this wider cone of light. Enlarging a lens in this fashion, while holding distances L1 & L2 constant, requires that the signal light interact with greater surface curvature near the edge of lens 19. This gives rise to increasing chromatic and spherical aberrations within the pupil image 45 at the photodetector. It also results in greater entry angles of the pupil image the photodetector. All of these phenomena cause broadening of the focused image.

FIG. 5 demonstrates another challenge in wide-field signal collection and transfer to a photodetector. The optical system depicted in the upper part of the figure is the same as in FIG. 3 and serves here as a reference. The optical system in the lower part of the figure shows the objective lens 8 translated to the left a distance "X". The leftward movement of objective lens 8 derives from a situation that arises quite commonly in multiphoton imaging work, especially when imaging large or cumbersome samples that may not be easily positioned at the ideal distance from the detection system. In these situations, the objective lens is moved toward the sample rather than the sample being moved toward the objective lens. As can be seen from the lower diagram of FIG. 5, as the objective lens 8 is moved away from focusing lens 19, the image of the objective pupil 45 also moves left away from its optimal focus on the photo-detector (or right if the objective lens 8 is moved toward focusing lens 19). In the situation illustrated in FIG. 5, where the objective pupil shifts left, the objective pupil image 45 also shifts to the left a distance "Y". The photodetector 20 is now presented with a diverging light beam of larger diameter 58, which, as detailed below, reduces detection efficiency.

In FIG. 6 another aspect of moving the objective lens is detailed. The schematic in the upper part of the figure is identical to that of FIG. 3 and again serves as a reference. This time, in the lower schematic of FIG. 6, the objective is translated downward (in the Y axis) a distance 59. According to standard optical principles associated with the function of focusing lens 19, this downward translation of the objective lens results in the image of the objective pupil 45 moving upward a distance 60. With this translation of the pupil image 45 the signal light no longer is centered on photodetector. In fact, if the translated distance is sufficiently large, the signal might miss the photodetector entirely. Again there is a loss of efficiency.

FIGS. 7 and 8 show a more rigorous modeling of an improved variation of the conventional detection path. Here, a large aperture objective lens 48 is shown emitting signal light in a cone 54 of +/−12 degrees. Two aspheric collector lenses 49 are used in series to provide increased optical power. The increased optical power reduces the L2/L1 ratio with the net result being a smaller image of the objective pupil at a photomultiplier tube (PMT) photocathode.

The geometric situation at a photomultiplier tube (PMT) photocathode is illustrated in isolation in FIG. 8, which is a magnified view of the right-hand portion of FIG. 7. This situation applies to other minimally sized detectors as well. This method of using optical power to concentrate the signal light on the detector approaches a practical point of diminishing returns, which is evident in FIG. 8. The PMT photocathode 51 has an active width 52. Because of the optical levering involved, the signal light bundle forms a very steep cone 55 as it enters the detector structure. It can be seen from FIG. 8 that these high-angle ray paths intercept the photocathode 51 at glancing angles, many fall near the outer edges, and in some cases 53 miss the photocathode entirely or hit support structure. These last three deficiencies all represent significant signal loss.

FIG. 9 is a schematic diagram of the photocathode of a high performance and widely used commercial photodetector: the Hamamatsu R3896 photomultiplier tube. The R3896 PMT has a photocathode 56 that is 24 mm by 8 mm. The spatial sensitivity of the photocathode in the X-axis 57 and the Y-axis 58 are graphically displayed along their respective axes. The full-width half-max (FWHM) points, 60 and 61, on the sensitivity curves are shown to highlight the most sensitive area of the photocathode. As is readily apparent from the two traces 57 and 58, the spatial sensitivity of the PMT is not constant. The photocathode 56 has a "sweet spot" where it is most sensitive. To maximize the inherent capability of the R3896 PMT the signal light to be detected must impinge upon the sweet spot of the detector. Superimposed upon the diagram of the detector photocathode is an circle 59. The circle indicates the "ideal case" projection of the signal light onto the photocathode as the lens pair 49 of FIG. 7 works to form the image of the pupil of objective lens 48 of FIG. 7 at the photocathode 56. The hatched area within the circle 59 indicates the portion of the impinging signal light that falls outside of the most sensitive FWHM area of the photocathode 56 where it is either lost or detected at considerably lower efficiency. The loss of efficiency is dramatically illustrated with the photocathode of the R3896 PMT. The same geometrical challenge arises with any photo-detector of minimum size when being coupled with these large aperture objective lenses.

SUMMARY OF THE INVENTION

A first version of the invention is directed to an apparatus for dividing and rearranging a light beam. This version of the invention comprises a first beam splitter configured to split the light beam into at least two independent light paths to yield at least a first light path and a second light path. This version further includes a first beam focuser configured to direct and focus the first light path onto a first position in a first focal plane, and a second beam focuser configured to direct and focus the second light path onto a second position in a second focal plane. The second position and the second focal plane may be the same as, or different from, the first position and the first focal plane, respectively. Thus in one specific version of the invention, the first and second beam focusers are configured so that the first and second light paths are superimposed upon one another at the first focal plane.

Another version of the invention comprises the version described in the immediately preceding paragraph and further comprising an objective lens configured to direct the light beam to the first beam splitter, and a projector disposed between the first beam splitter and the objective.

The versions of the invention as described in the previous two paragraphs may further comprise a translator mechanism dimensioned and configured to translate independently the objective lens, the projector (if one is present), or both (in the x-, y-, and/or z-axes).

The apparatus of the present invention may optionally comprise at least one photodetector configured to detect the first light path and the second light path. Where a photodetector is present, the invention may also optionally include a translator mechanism dimensioned and configured to translate the photodetector (in the x-, y-, and/or z-axes).

In one specific version of the invention, the apparatus as described in the first paragraph of this Summary section further comprises an objective lens configured to direct the light beam to the first beam splitter, and a projector disposed between the first beam splitter and the objective, at least one photodetector configured to detect the first light path and the second light path, and a translator mechanism dimensioned and configured to translate independently the objective lens, the projector, and the photodetector (in the x-, y-, and/or z-axes).

Another version of the invention may comprise at least two photodetectors corresponding to the at least two independent light paths, and wherein each light path is detected by its corresponding photodetector.

The beam splitter as used in all of the versions of the invention may comprises a device selected from the group consisting of a non-polarizing prism, a polarizing prism, a mirror, a half-silvered mirror, a dichroic mirror, and a polychroic mirror. This list is non-limiting. Other types of beam splitters now known or developed in the future may be used in the invention. It is preferred that the beam splitter is configured to split a light beam exiting an objective lens having a diameter of at least 10 mm, and more preferably having a diameter of at least 15 mm.

In yet another version of the invention, the first beam splitter is configured to split the light beam into at least four independent light paths to yield at least the first light path, the second light path, a third light path, and a fourth light path. In this version, the invention also further comprises a third beam focuser configured to focus the third light path onto a third position in a third focal plane, and a fourth beam focuser configured to focus the fourth light path onto a fourth position in a fourth focal plane. As in the first version of the invention, the first, second, third, and fourth positions and the first, second, third, and fourth focal planes are the same as, or different from, one another, respectively. In one particularly preferred embodiment of this version of the invention, the first, second, third, and fourth beam focusers are configured so that the first, second, third and fourth light paths are superimposed upon one another at the first focal plane.

As with the other versions of the invention, this version may optionally comprise an objective lens configured to direct the light beam to the first beam splitter, a projector disposed between the first beam splitter and the objective, and one or more photodetectors. This version of the invention may likewise comprise a translator mechanism dimensioned and configured to translate independently the objective lens, the projector, and/or the photodetector, as noted earlier.

In still another version of the invention, the apparatus comprises the elements described in the first paragraph of this Summary section and further comprises a second beam splitter disposed in the light beam at a point upstream from the first beam splitter, wherein the second beam splitter is configured to split the light beam into light path 1' and light path 2', and wherein light path 1' is directed toward the first beam splitter. Here, the apparatus further comprises a third beam splitter configured to split light path 2' into at least two independent light paths to yield at least a third light path and a fourth light path, and a third beam focuser configured to focus the third light path onto a third position in a third focal plane; and a fourth beam focuser configured to focus the fourth light path onto a fourth position in a fourth focal plane. As in previous versions of the invention, the first, second, third, and fourth positions and the first, second, third, and fourth focal planes are the same as, or different from, one another, respectively.

Yet another version of the invention is directed to an apparatus for focusing a light beam. Here, the apparatus comprises a first beam splitter configured to split the light beam into "n" independent light paths, where "n" is an integer $\geqq 2$, and a corresponding beam focuser disposed in each of the "n" independent light paths, wherein each beam focuser is configured to focus its corresponding light path onto a first focal plane, and further wherein each beam focuser is configured so that each of the "n" independent light paths are superimposed upon one another at the first focal plane.

A final version of the invention is directed to a microscope comprising an objective lens, a projector, a photodetector, and a translator mechanism dimensioned and configured to translate independently the objective lens, the projector, and the photodetector, in the x-, y-, and/or z-axes.

In the most preferred version of the invention, the apparatus also comprises a photo-detector disposed at the first focal plane. The nature of the photo-detector is not critical to the invention. Thus, the photo-detector may be any design, without limitation, now known or developed in the future, for example photomultiplier tubes, charge-coupled devices, and the like. A huge number of photo-detectors are available in the commercial markets from worldwide suppliers such as Hamamatsu Photonics (Bridgewater, N.J., and Hamamatsu City, Japan).

The main advantage and utility is in wide-field, high-resolution multiphoton microscopy. In these uses, it is preferred that the beam splitter is dimensioned and configured to split a light beam exiting an objective lens or condenser lens, or a projected image of that light beam exiting the objective lens or condenser lens, and having a diameter of at least about 10 mm, more preferably at least about 15 mm, and more preferably still at least about 17 mm. Of course, implementing the apparatus using objectives larger and smaller than these recited ranges is within the scope of the invention.

Throughout the specification and claims, the words "lens," "mirror," and the like are generally used in their singular form. This is for purposes of brevity only. As used herein, all optical devices listed in their singular form also explicitly include the corresponding plural form. Thus, the words "lens" as used herein to accomplish a specific task explicitly includes "lenses" to accomplish the same task, the word "mirror" includes "mirrors," etc. Likewise, terms such as "beam splitter," "beam focuser," etc., explicitly denote herein both singular and plural forms of these nouns. The word "light" as used herein is synonymous with "electromagnetic radiation," and explicitly includes (without limitation) electromagnetic radiation falling within the UV, visible, IR wavelengths.

A "beam splitter" is defined herein as being any combination of lenses, mirrors, prisms, gratings, interferometers, and the like, that functions to split an incoming light beam into two or more independent light beams or light paths. ("Light beam" and "light path" are used synonymously herein.) Beam splitter designs suitable for use in the present invention can either be now known to the art or developed in the future. Likewise, a "beam focuser" is defined herein as being any combination of lenses, mirrors, prisms, gratings, and the like, that functions to focus a light beam onto a pre-selected focal plane. Beam focuser designs suitable for use in the present invention can either be now known to the art or developed in the future.

The invention, while conceived in the context of fluorescence emission multiphoton microscopy, can be utilized in any microscopy or spectroscopy application where it is desired to reduce the cross-sectional area of an original light beam without reducing the energy content (or information content) of the light beam. The invention can be made to function using any wavelength of electromagnetic energy, but is preferred for use with light beams falling within the infrared, visible, and ultraviolet spectra, that is, electromagnetic radiation of from about 1 nm (i.e., extreme ultraviolet) to about 1 mm (i.e., far infrared). Unless noted otherwise, the term "light" as used herein explicitly electromagnetic radiation of any wavelength.

DETAILED DESCRIPTION OF THE INVENTION

The present invention provides a novel apparatus and corresponding method to improve the distribution of the signal flux from a large aperture objective lens. The signal is divided (i.e. partitioned) and the partitioned sub-signals superimposed onto the active area of a small photodetector. The device is particularly suitable in the field of multiphoton microscopy in general and fluorescent and/or harmonic emission multiphoton microscopy in particular.

Thus, the invention is directed to an apparatus for spatial partitioning and redistribution of light emitted from a source object. The source object may be any object emitting electromagnetic radiation, such as a microscope objective lens pupil emitting signal light. (Again, "light" as used herein includes all forms of electromagnetic radiation—microwaves, UV, visible, IR, etc.) The simplest version of the invention comprises a first beam splitter. This beam splitter is configured to split the signal light into "n" independent beam paths, where "n" is an integer≧2. This results in "n" independent beam paths, which can be manipulated independently of one another. At least one beam focuser is disposed in each of the plurality of independent beam paths. That is, at a minimum there are "n" beam focusers, with at least one beam focuser disposed in each of the independent light paths. Each beam focuser is dimensioned and configured to focus its corresponding beam onto a first focal plane. Each beam focuser is also dimensioned and configured so that each of the plurality of beam paths are superimposed upon one another at the first focal plane. In this fashion, the original beam is divided into two or more independent beam paths, each carrying light with spatial and directional information from different and distinct areas of the original source object. The light "bundles" in these independent beam paths, are then recombined by being superimposed as piecewise images upon one another at their common first focal plane to yield a superimposed image that retains substantially all of the energy of the original light path (i.e., substantially all of the energy from the original signal). While there will be some losses due to the inefficiencies inherent in lenses, mirrors, and the like), the superimposed signal delivered to the first focal plane retains substantially all of the energy of the original light path, but has a much smaller cross-sectional area than the original, non-partitioned signal.

Figure 10:
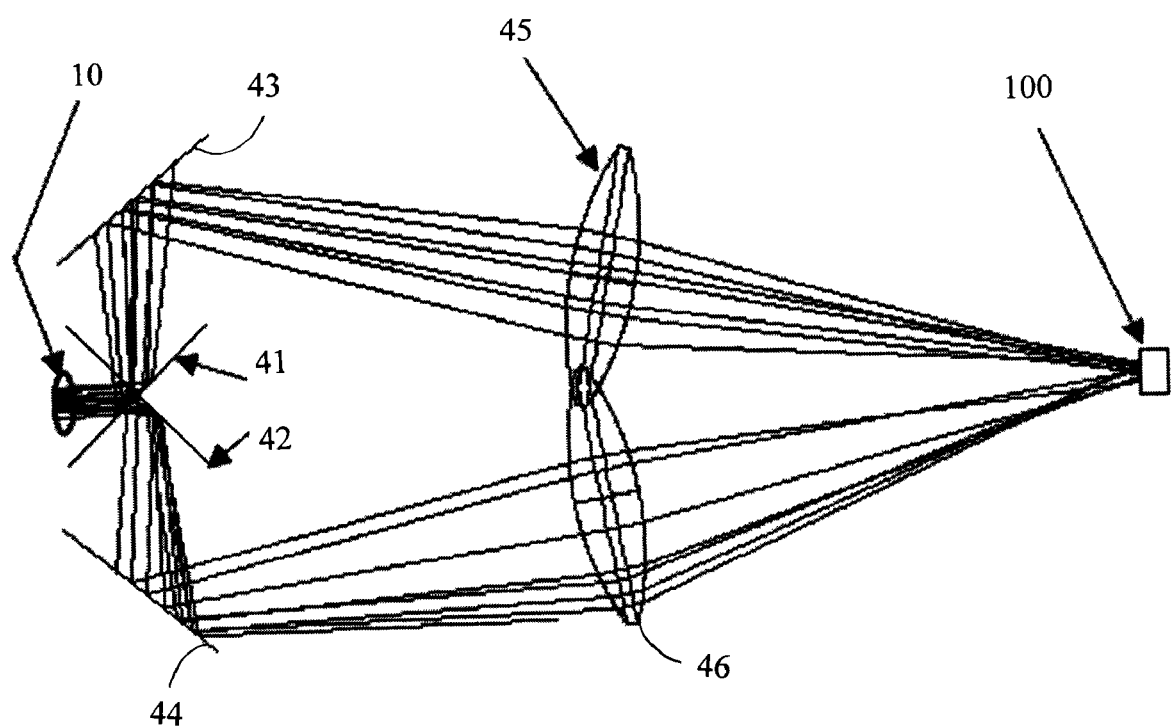
FIG. 10 is a two-dimensional schematic of a first version for splitting and recombining the source object light according to the present invention. It shows the splitting mirrors, individual focusing lenses, and the light beams being superimposed on a photo-detector.

This first version of the invention is illustrated schematically in FIG. 10. As shown in the figure, the source object 10 emits an original signal that is partitioned into two smaller beam paths by a beam splitter comprised of mirrors 41 and 42 as shown in FIG. 10. The beam paths are then reflected of turning mirrors 43 and 44, respectively, and passed through corresponding beam focusers 45 and 46 to bring the two beam paths into superimposition at a focal point. As shown in FIG. 10, a photodetector 100 may be positioned at the focal point.

Figure 11:
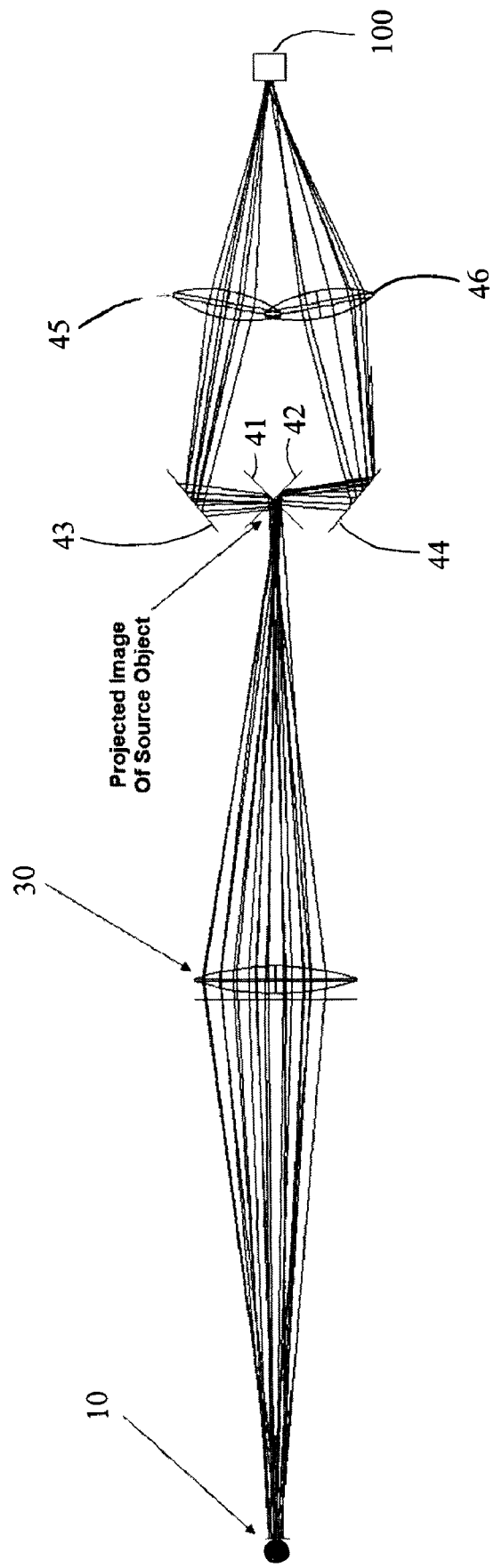
FIG. 11 is a two dimensional schematic showing the minimum apparatus for splitting and recombining the source object light with the addition of a focusing lens to project an image of the source object to a distant point where the splitting apparatus can be positioned.

The invention may also comprise a optical elements to project an image of the source object to a plane at some distance from the source object. See FIG. 11. In FIG. 11, the right-hand side of the figure is identical to FIG. 10, and includes beam splitter mirrors 41 and 42, turning mirrors 43 and 44, and corresponding beam focusers 45 and 46. The two beam paths are brought into superimposition at a focal point. As in FIG. 10, a photodetector 100 is positioned at the focal point. But rather than having the source object 10 emit light directly into the beam-splitter, a projector 30 is interposed between the source object and the beam splitter. The projector 30 may include any combination of lens and/or lenses, diffractive elements, reflective elements, etc. In this case the beam splitter 30 is preferably (although not necessarily) positioned at a projected image plane rather than near the source object 10.

Figure 12:
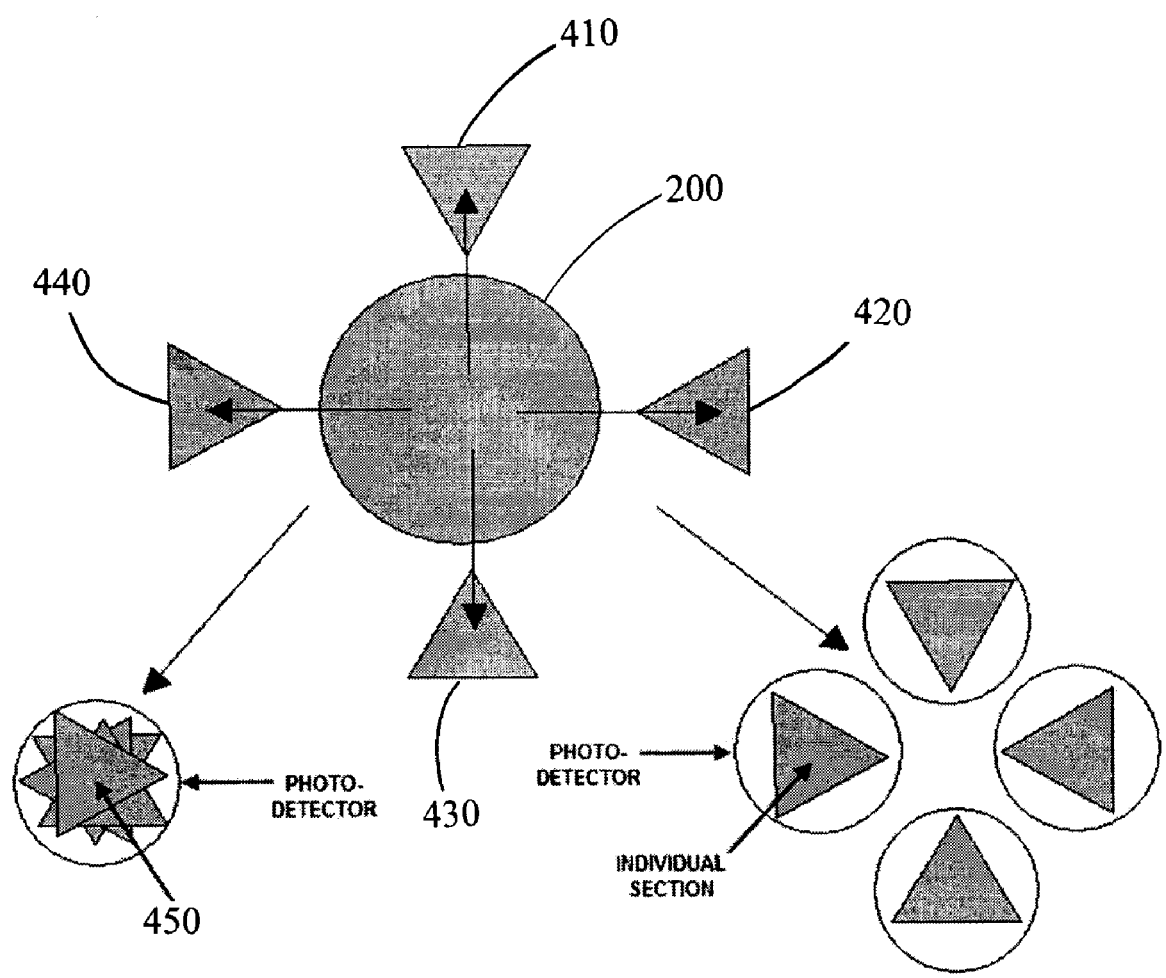
FIG. 12 is a diagrammatic representation of the flexibility of the apparatus to either superimpose the "sub-sections" on a single photo-detector or to distribute them to a plurality of photo-detectors.

As shown in FIGS. 10 and 11, which are preferred versions of the invention, the partitioned beams are superimposed upon one another at a desired point in space, i.e., at a focal point that can be detected by photodetector 100. However, this is not an absolute requirement of the invention. Once the beam paths are partitioned, the resulting partitioned beam paths can be manipulated independently. Thus, other versions of the invention do not require that the partitioned beam paths be superimposed upon each other or upon the same photodetector. In short, one version of the invention, illustrated schematically in FIG. 12, provides a convenient apparatus to manipulate these piecewise images (i.e., the partitioned beam paths) onto a plurality of photodetectors (or onto, or into, any other type of optical or electro-optical device). In FIG. 12, the original signal from the source object 200 is depicted as a beam of circular cross-section having an original. This original signal is partitioned into four (4) independent beam paths 410, 420, 430, and 440 using two beam splitters as described above. The ultimate fate of these four beam paths are different in different versions of the invention. In the lower left-hand side of FIG. 12 is illustrated the preferred version of the invention. Here, the four beam paths are superimposed upon one another, thereby yielding a combined signal 450 that has substantially all of the energy of the original signal, but compressed into a much small diameter (as indicated by the circle circumscribing the combined signal 450). Alternatively, as shown in the lower right-hand side of FIG. 12, the four independent beam paths may be directed independently to individual photodetectors (or other devices). For example, if the devices are each a distinct photodetectors, the plurality of photodetectors may be used to sum the signals generated by the four independent beam paths (410, 420, 430, and 440), or to produce a difference, a ratio, or any mathematical function of the signals of the individual beam paths generated from the original source object.

Figure 5:
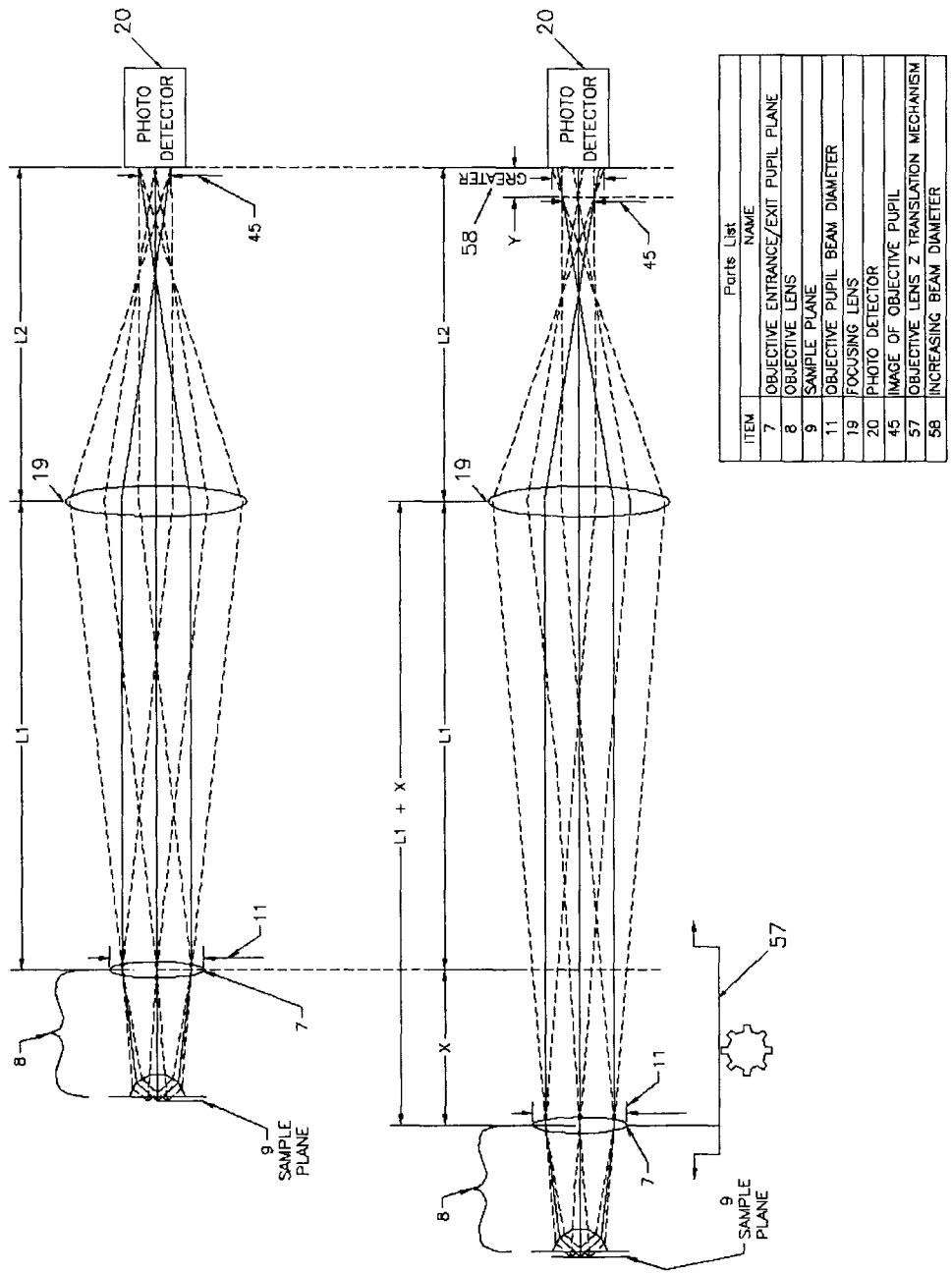
FIG. 5 contains an upper two-dimensional schematic similar to FIG. 3 as a reference and a lower two-dimensional schematic showing the objective lens translated along the Z axis and the resulting shift of the objective pupil image.
Figure 13:
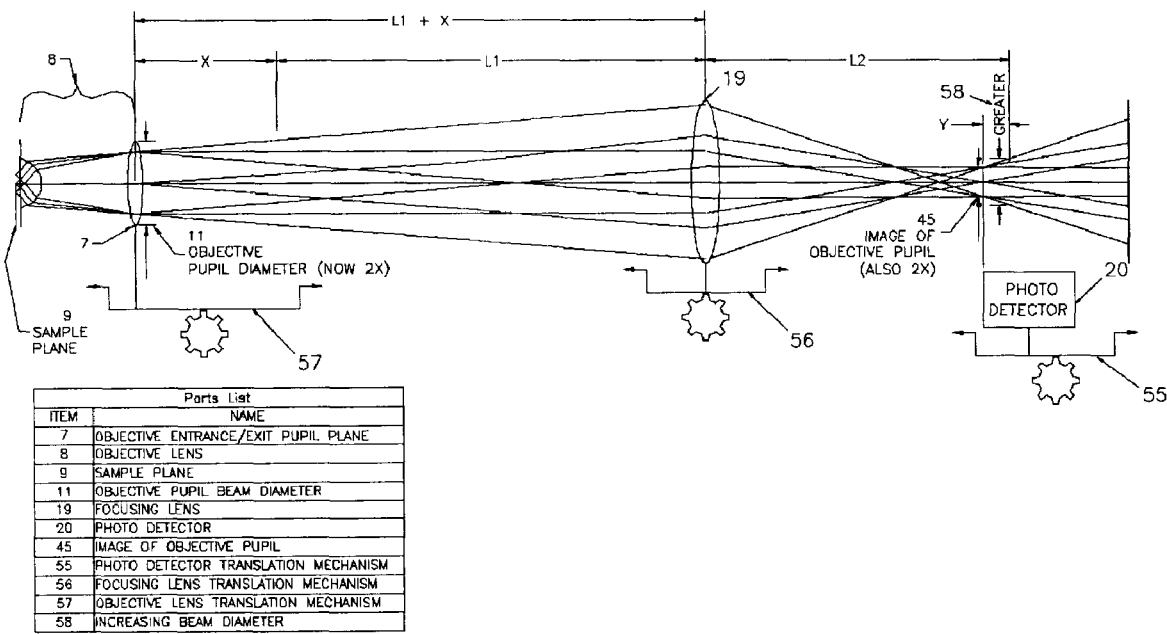
FIG. 13 is a two-dimensional schematic showing the application of axial translation mechanisms to compensate for the axial objective shift described in FIG. 5.

The projector 30 described in FIG. 11 additionally yields a novel and convenient apparatus to compensate for the image plane shift problem illustrated in FIG. 5 and discussed earlier. This compensation solution, illustrated schematically in FIGS. 13 and 14, can be implemented independently of the splitter mechanism and thus can be implemented with or without the pupil division and redistribution. FIG. 13 shows schematically the lower optical section of FIG. 5, with a left-shifted objective lens 8 and the resultant shift of the image of the objective pupil 45 to the left. Through optical principles it is possible to adjust the location of focusing lens 19 such that the image plane can be shifted back to its original position. The axial adjustment of focusing lens 19 (i.e., translating the lens 19 to the left or right, in the X-axis) can be accomplished with any translating mechanism 56 now known or developed in the future. The translating mechanism may be automatic, manual, continuous, or discrete (e.g., continuously adjustable friction sliders, detent sliders, worm gears, other gearing, etc.). The power of the focusing lens 19 could also be varied. That is, the lens 19 may comprise multiple lenses in a "zoom lens" configuration. The lens or mirror or element could also be constructed of a material whose refractive, reflective or diffractive properties can be altered to vary the power of the focusing element. Alternatively, the photodetector 20 and/or objective 8 may also be translated by translating mechanisms 55 and 57 (respectively) to compensate for the objective pupil image shift. The mechanisms 55 and 57 may also be any translating mechanism now known or developed in the future.

Figure 6:
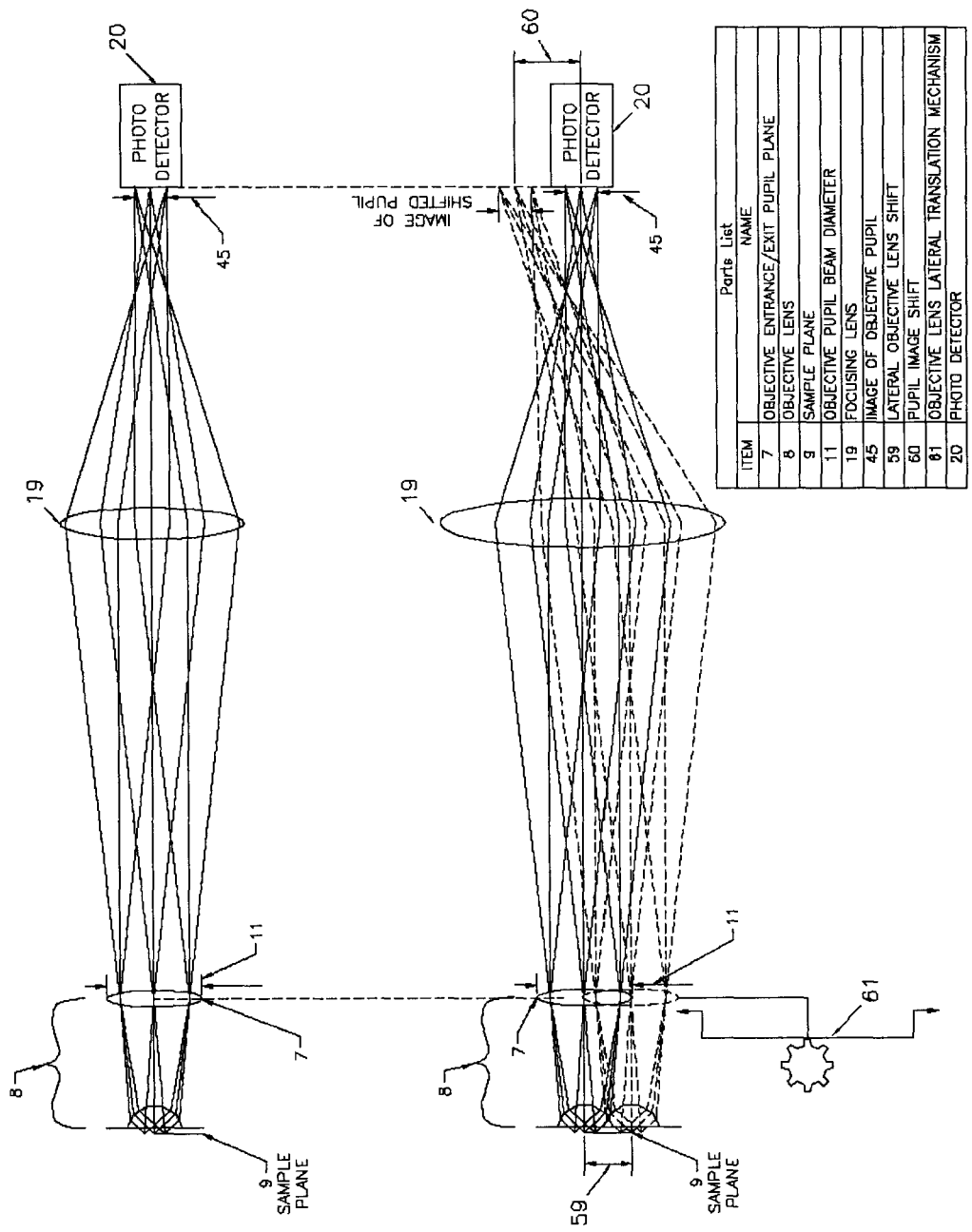
FIG. 6 contains an upper two-dimensional schematic similar to FIG. 3 as a reference and a lower two-dimensional schematic demonstrating lateral shift of the objective lens and the resulting lateral shift of the objective pupil image.
Figure 7:
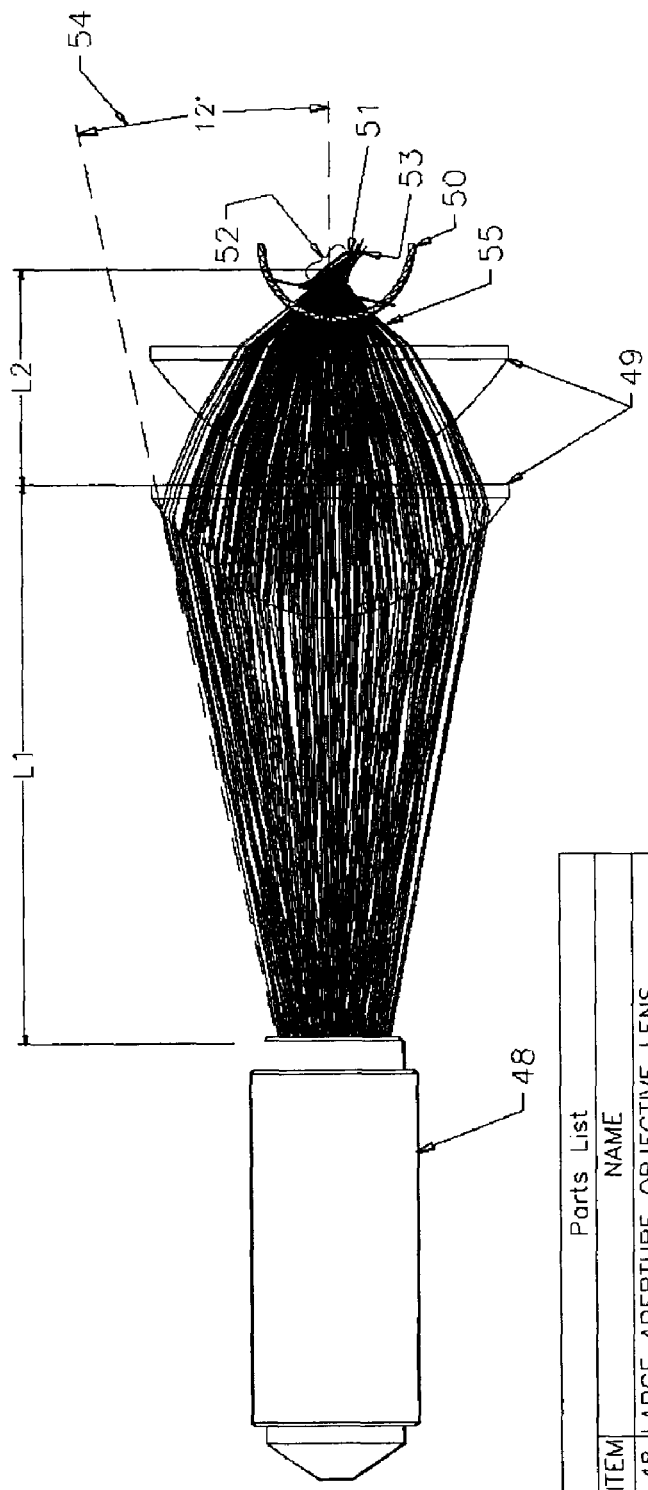
FIG. 7 is a two-dimensional schematic showing more rigorous modeling of an improved variation of the conventional detection path of FIG. 4.
Figure 8:
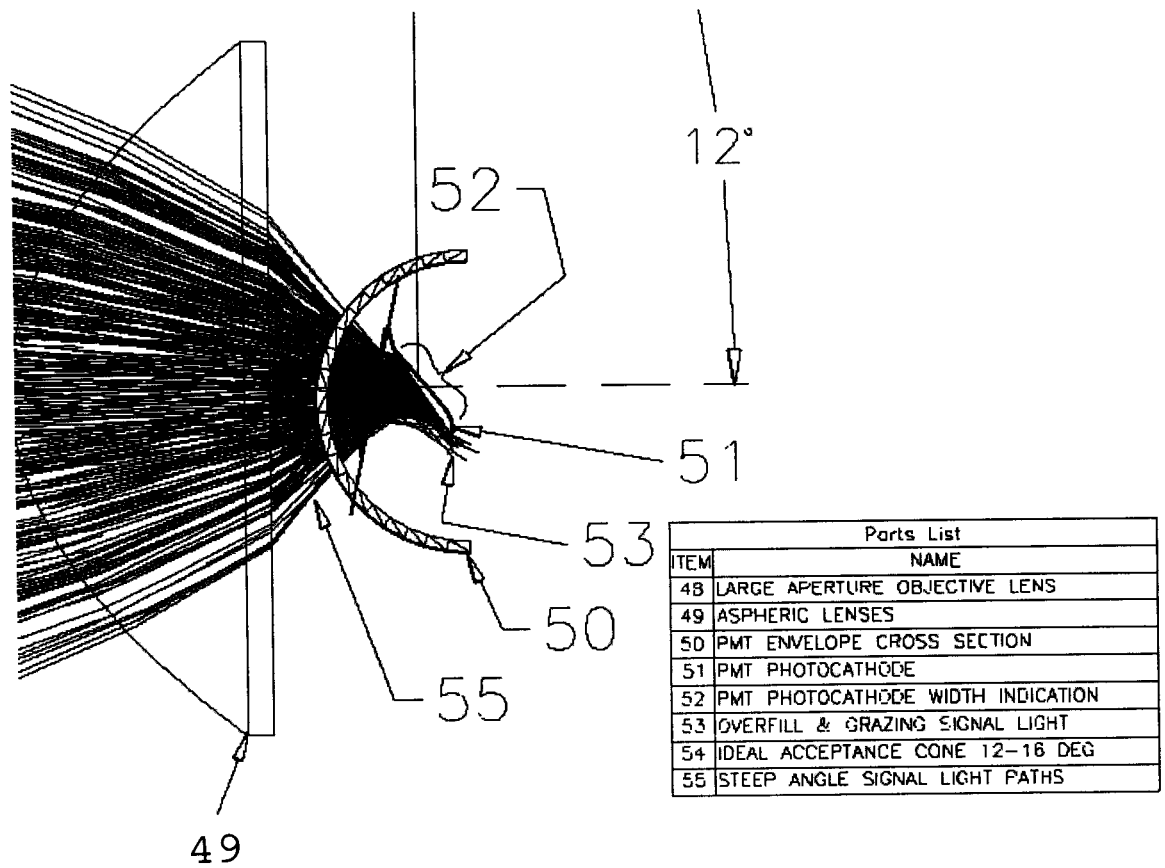
FIG. 8 is a two-dimensional schematic showing the details of the geometric situation at a photomultiplier tube (PMT) photocathode.
Figure 14:
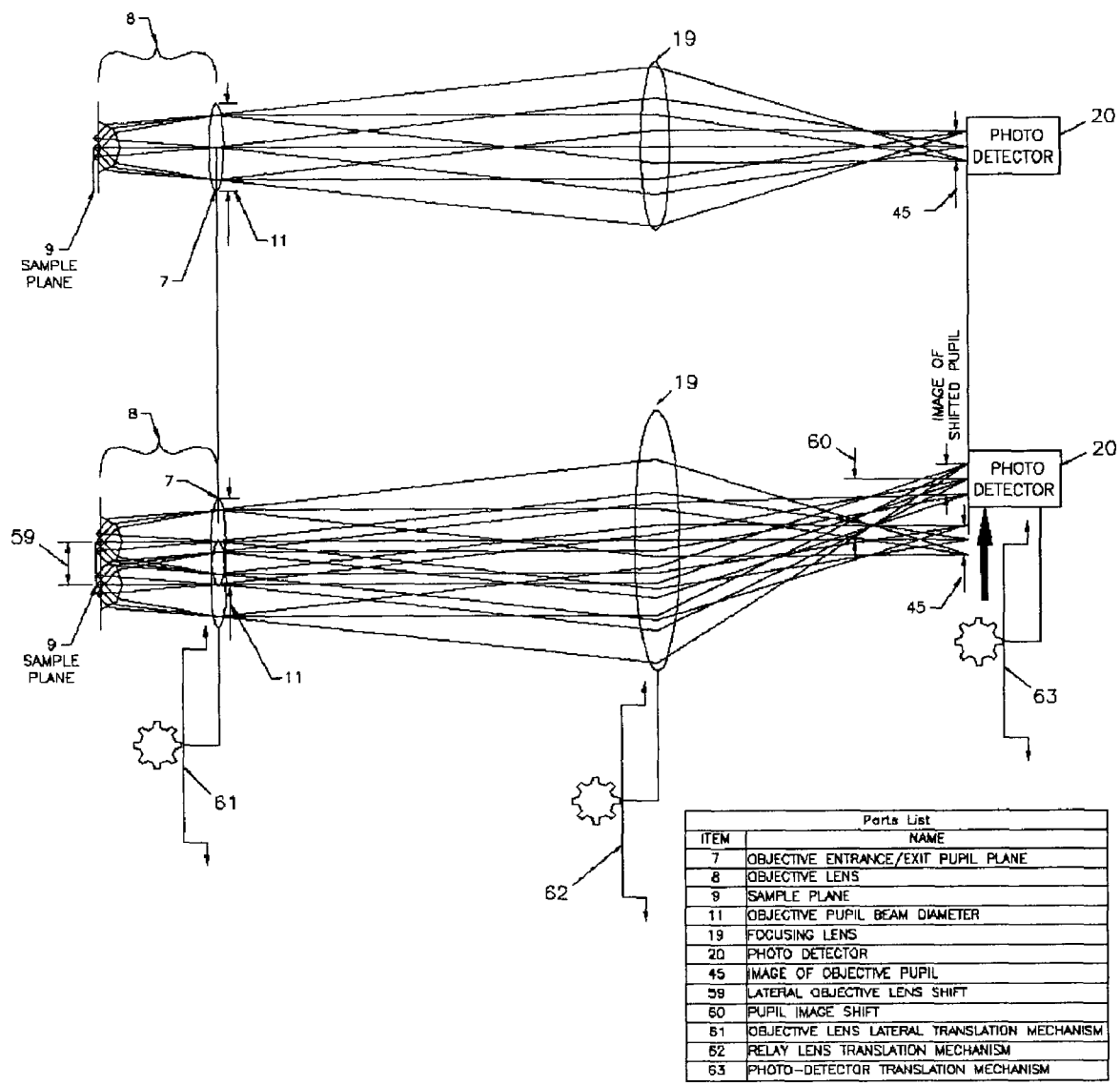
FIG. 14 is a two-dimensional schematic showing the application of lateral translation mechanisms to the focusing relay lens and to the photo-detector to compensate for lateral translation of the objective illustrated in FIG. 6.

The axial translation method of compensating for objective lens movement just described can be extended with similar principles to compensate for lateral shift of the objective lens pupil image as illustrated in FIG. 6 and described earlier. Referring now to FIG. 14, by arranging an appropriate lateral translation mechanism 62 (i.e., translating the lens 19 up or down, in the Y-axis) for the focusing lens 19 and/or a lateral translation mechanism 63 for the photo-detector 20, appropriate compensation can be made in the positioning of these elements. Through normal optical principles, lateral translation of focusing lens 19 will move the image of the objective pupil back to the original location 45 where it again is centered on the photodetector. Alternatively, the translation mechanism 63 for the photodetector can be used to move the photodetector to the position now occupied by the shifted pupil image 60. One or the other or both of these translations can be combined to accomplish the goal of repositioning the image of the objective pupil on the sweet spot of the photo-detector. As in the FIG. 13, the mechanisms 61, 62, and 63 may also be any translating mechanism now known or developed in the future. The translation mechanism may be configured to move these elements in any of the x-, y- and/or z-axes.

In two of the more preferred versions of the invention, which may, but need not necessarily include elements to project an image of the source object to a plane apart from the object, the first beam splitter is configured to split the light beam into at least two independent light paths to yield at least a first beam path and a second beam path. In these versions of the invention (with or without a projector 30), the apparatus would then also comprise a first beam focuser and a second beam focuser (one for each independent beam path). See FIGS. 10 and 11. In these versions of the invention, the first and second beam focusers are likewise dimensioned and configured to focus the two independent beam paths onto a first focal plane in such a fashion that the spatial and directional information in the two beam paths are superimposed upon one another as piecewise images at the first focal plane.

The beam splitter may be any optical element now known or developed in the future for splitting a beam of light into two independent sub-beams. Preferably the beam splitter comprises one or more of a non-polarizing prism, a polarizing prism, a mirror, a half-silvered mirror, a dichroic mirror, and/or a polychroic mirror. The first and second beam focusers preferably comprise at least one lens and/or diffractive element, or at least one lens and/or diffractive element and at least one mirror.

Figure 15:
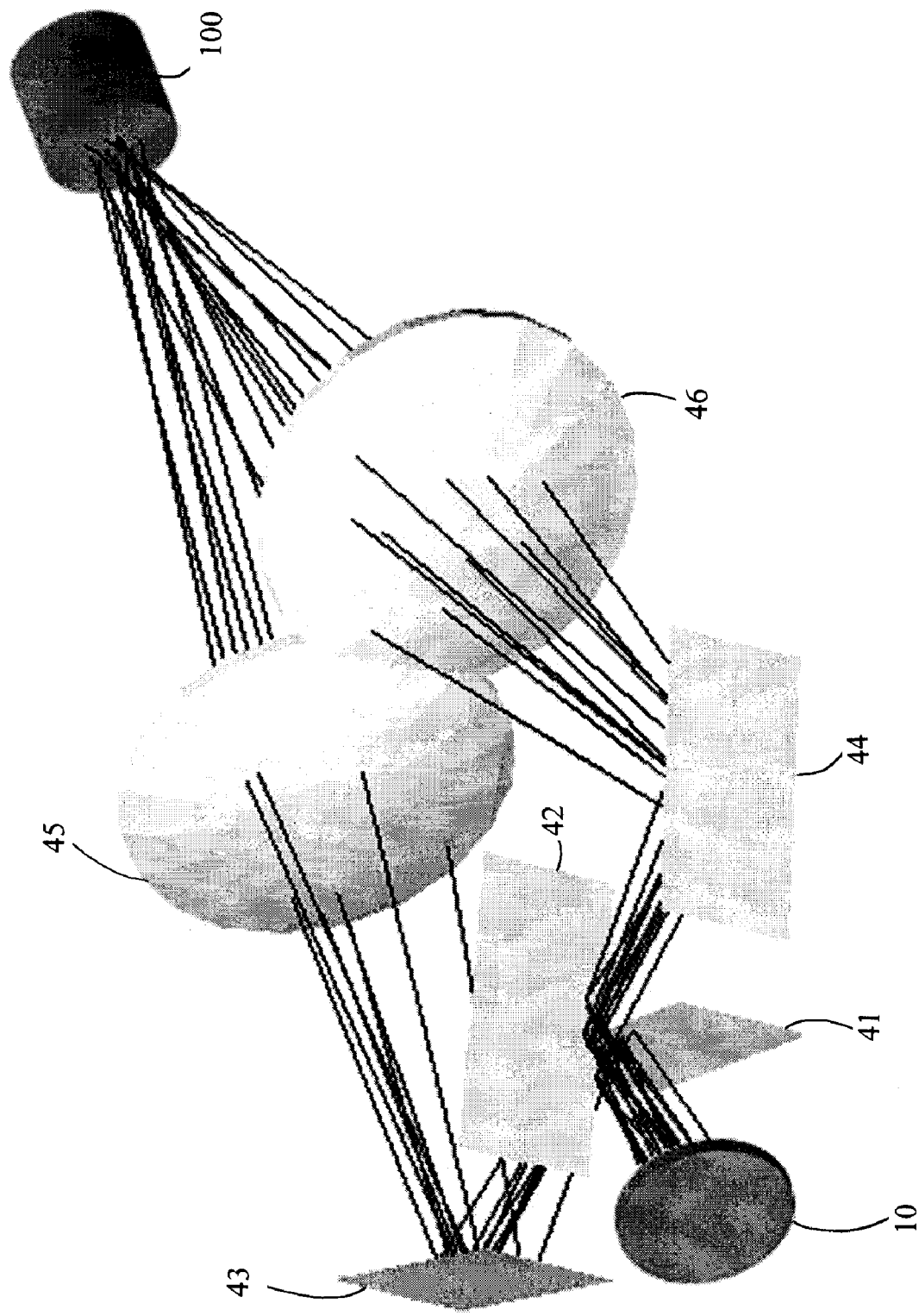
FIG. 15 is a three-dimensional schematic rendering of a first version of the invention as depicted in a two-dimensional rendering in FIG. 10. Shown is a version of the invention for pupil division and parallel rearrangement according to the present invention wherein the image of the exit pupil is divided into two half-images.

FIGS. 10 and 15 (reduced to just the minimum splitter section) illustrate schematically a first, and most basic, version of the invention. The same reference numerals are used to depict the same elements in both of the figures. While FIG. 10 depicts the beam paths in two dimensions, FIG. 15 shows this first version of the invention in a three-dimensional schematic diagram. As shown in these two figures, a low-power, high-NA lens 10 is used to image a specimen. (As shown in FIG. 11, the image exiting the lens 10 may be directed toward a moderate focal length lens 30 to relay the image to a second plane. This projector 30 is omitted in FIGS. 10 and 15.) A first pair of mirrors 41 and 42 together define a beam splitter. The mirrors 41 and 42 are disposed in such a fashion that the mirrors, in cooperation with one another, split the image into different directions so that each individual light path can be manipulated independently of the other light path. As shown in FIGS. 10 and 15, the mirrors 41 and 42 are disposed at right angles to one another. This is just one suitable arrangement of the mirrors 41 and 42 to yield a beam splitter. The mirrors 41 and 42 may be disposed at any angle relative to one another and relative to the light path so as to split the image into two (or more) independent light paths.

The two light paths are then manipulated such that they are superimposed upon one another and focused on the "sweet spot" of the detector window of a photo-detector 100. (The photo-detector 100 may be any type of photo-detector now known or developed in the future, without limitation.) As depicted in FIGS. 10 and 15, the image exiting the objective lens 10 is split into two half-images by the beam splitter comprised of mirrors 41 and 42. A first half-image is directed to mirror 44, which the directs the first half-image through lens 46 which focuses the first half-image on the "sweet spot" of the photo-detector 100. The mirror 44 and lens 46 together constitute a first beam focuser. The second half-image is directed to mirror 43, which the directs the second half-image through lens 45 which (in the same fashion as lens 46) focuses the second half-image on the "sweet spot" of the photo-detector 100, superimposed upon the first half image. Likewise, the mirror 43 and lens 45 together constitute a second beam focuser. In this fashion, the entire signal exiting the objective lens 10 is focused squarely within the "sweet spot" of the detector 100.

Figure 16:
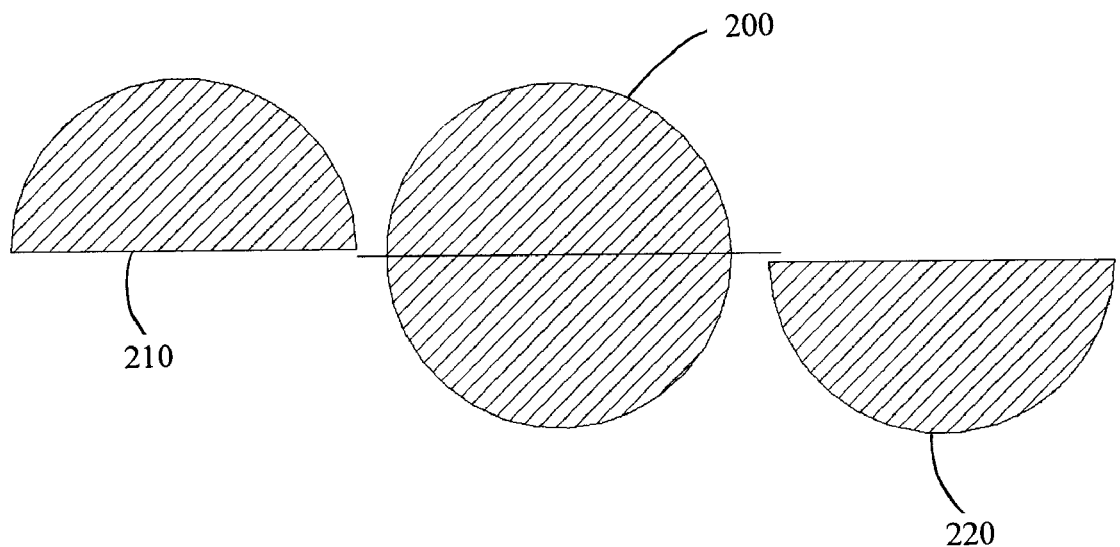
FIG. 16 is a diagrammatic representation of the flexibility of the rearrangement section of the apparatus to direct the sub-sections to independent photodetectors or other devices.
Figure 17:
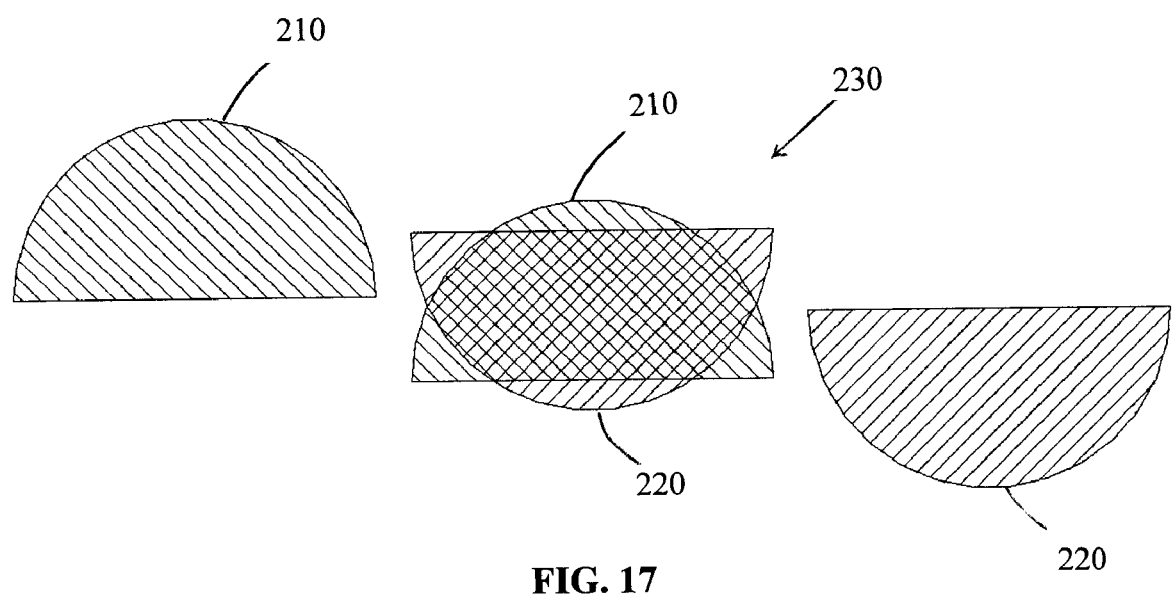
FIG. 17 is a diagrammatic representation of the flexibility of the rearrangement section of the apparatus to superimpose individual sub-sections of the source object image onto a smaller area.

The cross-section of the image emanating from the exit pupil of objective lens 10 prior to division, and immediately following division using the device shown in FIGS. 10 and 15, is depicted schematically in FIG. 16. The cross-section of the image after rearrangement and superimposition of the two half-images is depicted schematically in FIG. 17. In other words, FIGS. 16 and 17 depict what the light path looks like when viewed "end-on" at the point the light path hits mirrors 41 and 42 of FIGS. 10 and 15 and at the point the light paths are superimposed upon one another at the photo-detector 100 of FIGS. 10 and 15. As shown in FIG. 16, at the point just prior to the light path hitting mirrors 41 and 42, the light path or full image 200 is circular in cross-section. The image is then split by mirrors 41 and 42 to yield two divergent half images 210 and 220. The two half-images are then directed to the photodetector and superimposed upon one another at the plane of the photo-detector: one half image is reflected off mirror 44 and passes through lens 46; the other half image is reflected off mirror 43 and passes through lens 45. As shown in FIG. 17, the two half images 210 and 220 are then superimposed upon one another to yield the superimposed image 230, which has a much smaller area (roughly 50% smaller) than the original image 200.

The pupil division and parallel rearrangement/superimposition of the resulting split beams can be accomplished in any geometric configuration, without limitation. The apparatus shown in FIGS. 10 and 15 uses a beam splitter that divides the original image from the exit pupil into two half images. The version shown in FIGS. 10 and 15 thus includes two beam focusers to recombine and superimpose the two half images.

Figure 18:
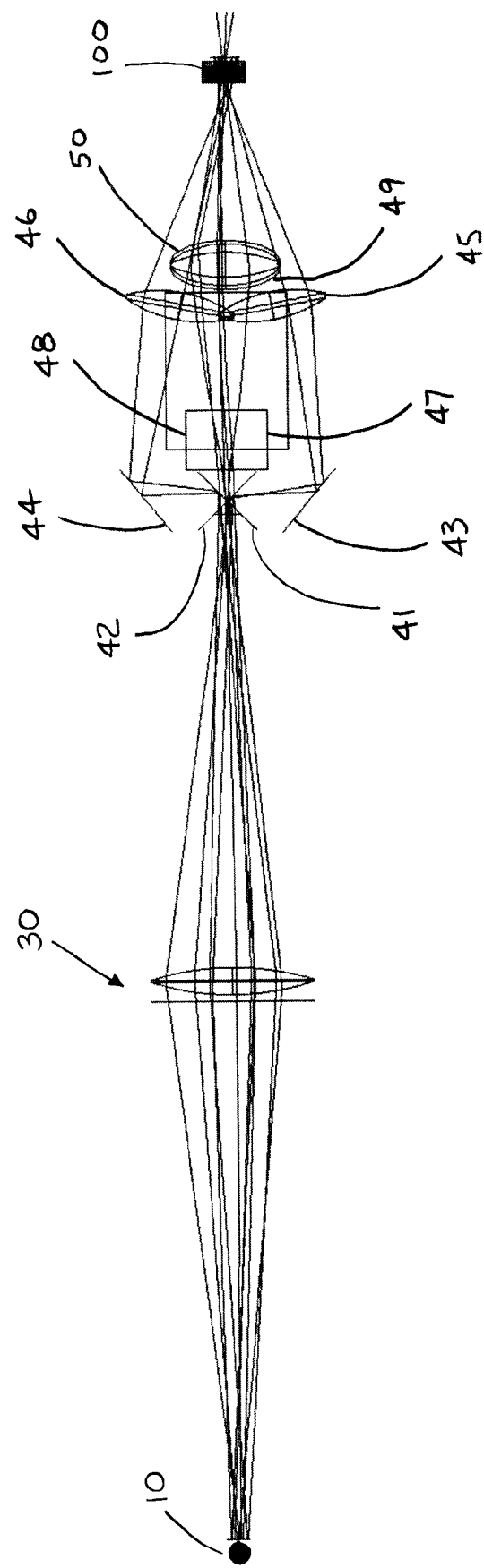
FIG. 18 is a two-dimensional schematic of a version of the division and rearrangement apparatus according to the present invention in a configuration which includes a focusing lens to project an image of the source object to a distant point and showing the locations where two beam splitting devices can be inserted to divide the signal light into four channels.
Figure 19:
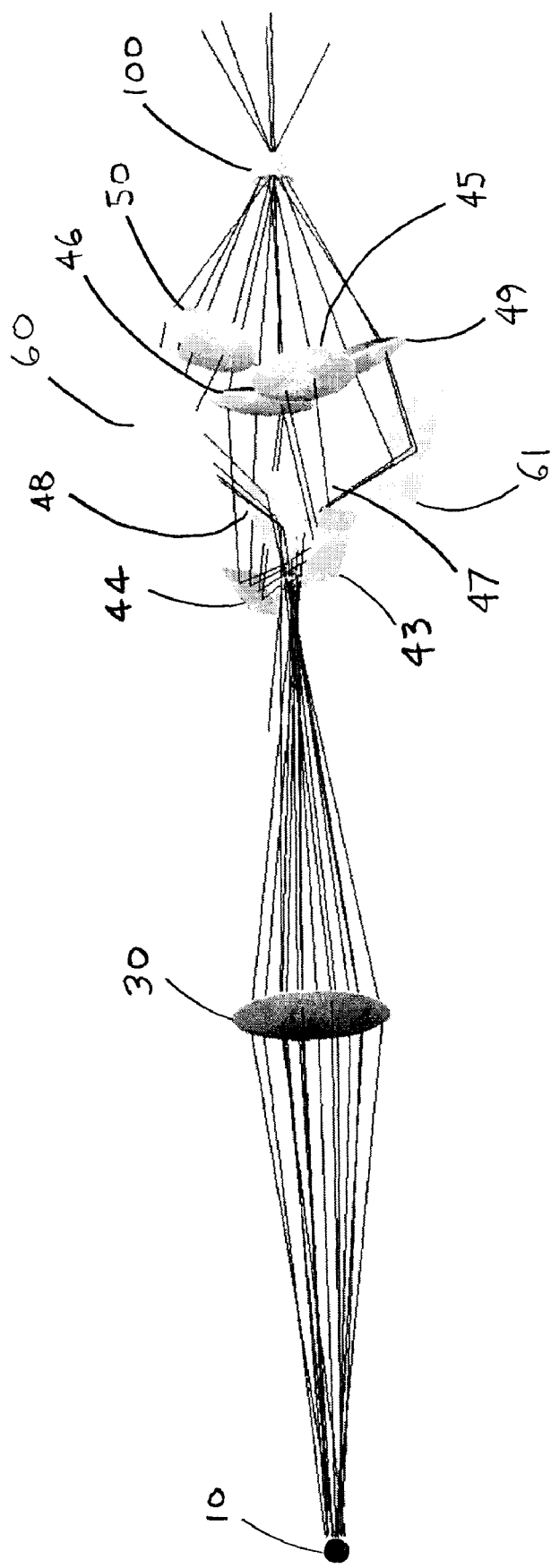
FIG. 19 is a three-dimensional schematic of the version of the invention depicted in FIG. 18.

Yet another version of the invention, illustrated schematically in FIGS. 18 and 19, uses a beam splitter that divides the original image from the exit pupil into four sections and then superimposes the four sections on top of one another to yield a superimposed image having a roughly rectangular cross-section. (See FIGS. 20 and 21.)

Figure 20:
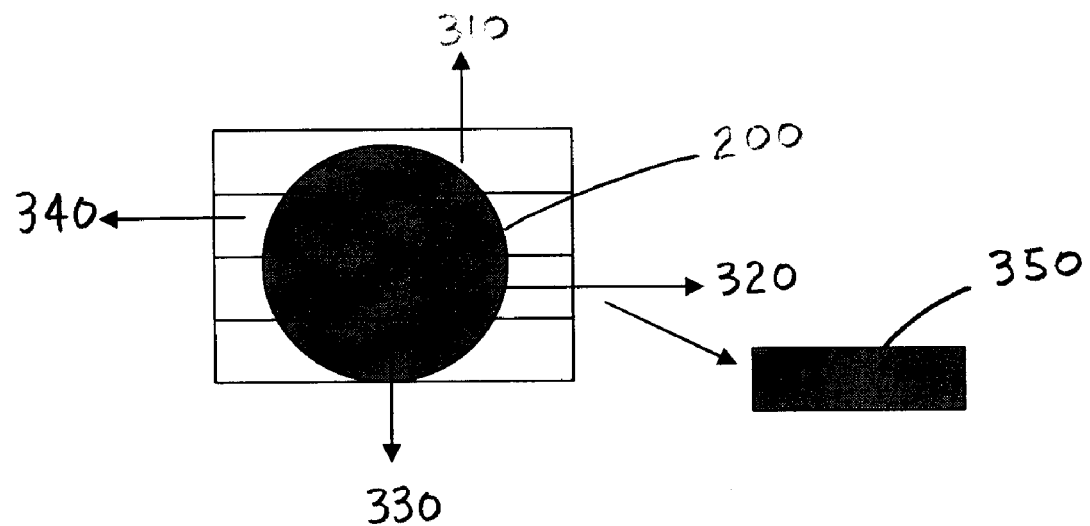
FIG. 20 is a schematic representation of the image of the exit pupil at the point the image is divided into four parallel sections; the four sections are then rearranged to yield an image having a rectangular cross-section.

Referring now to FIGS. 18 and 19, FIG. 18 shows the second version of the invention in a two-dimensional schematic diagram, while FIG. 19 shows that same version in a three-dimensional schematic diagram. In the exact same fashion as the first version of the invention, a low-power, high-NA lens 10 is used to image a specimen. The image exiting the lens 10 is directed toward a moderate focal length lens 30 to relay the image to a second plane. Disposed at this second plane are two pairs of mirrors: 41 and 42 (as in the first version of the invention) and 47 and 48. Mirrors 41, 42, 47, and 48 together constitute a beam splitter. The four mirrors cooperate to split the incoming image into four independent light paths. Again, the mirror pair 41 and 42 is disposed in such a fashion that the mirrors, in cooperation with one another, split the image into different directions so that each individual light path can be manipulated independently of the other light path. The same is true of the mirror pair 47 and 48. As shown in FIGS. 19 and 20, the mirrors 41 and 42 are disposed at right angles to one another. This is just one suitable arrangement of the mirrors 41 and 42. The mirrors 41 and 42 may be disposed at any angle relative to one another and relative to the light path so as to split the image into two (or more) independent light paths. Likewise, the mirrors 47 and 48 may disposed at any angle relative to one another and relative to the light path so as to split the image into two (or more) independent light paths. The result is that the original exit pupil image is divided into four independent light paths by the beam splitter comprised of mirrors 41, 42, 47, and 48.

In the same fashion as in the first version of the invention, the four light paths are then manipulated such that they are superimposed upon one another and focused on the "sweet spot" of the detector window of a photo-detector 100. As depicted in FIGS. 18 and 19, the circular cross-section image exiting the objective lens 10 is split into four parallel sections by mirrors 41, 42, 47 and 48. The four light paths are then directed to corresponding mirrors and lenses (beam focusers) which superimpose the four light paths and focus them on the detector 100. As shown in FIGS. 18 and 19, the light reflected from mirror 41 is then reflected off mirror 43, passes through lens 45, and is focused on detector 100. The light reflected from mirror 42 is reflected off mirror 44, passes through lens 46, and is focused on detector 100. The light reflected from mirror 47 is reflected off mirror 61, passes through lens 49, and is focused on detector 100. The light reflected from mirror 48 is reflected off mirror 60, passes through lens 50, and is focused on detector 100. Each matched set of mirror and lens (i.e. mirror 43/lens 45, mirror 44/lens 46, mirror 61/lens 49, and mirror 60/lens 50) constitutes a beam focuser. In this fashion, the four independent light paths are superimposed upon each other, in focus, upon the most sensitive area of the detector.

Figure 9:
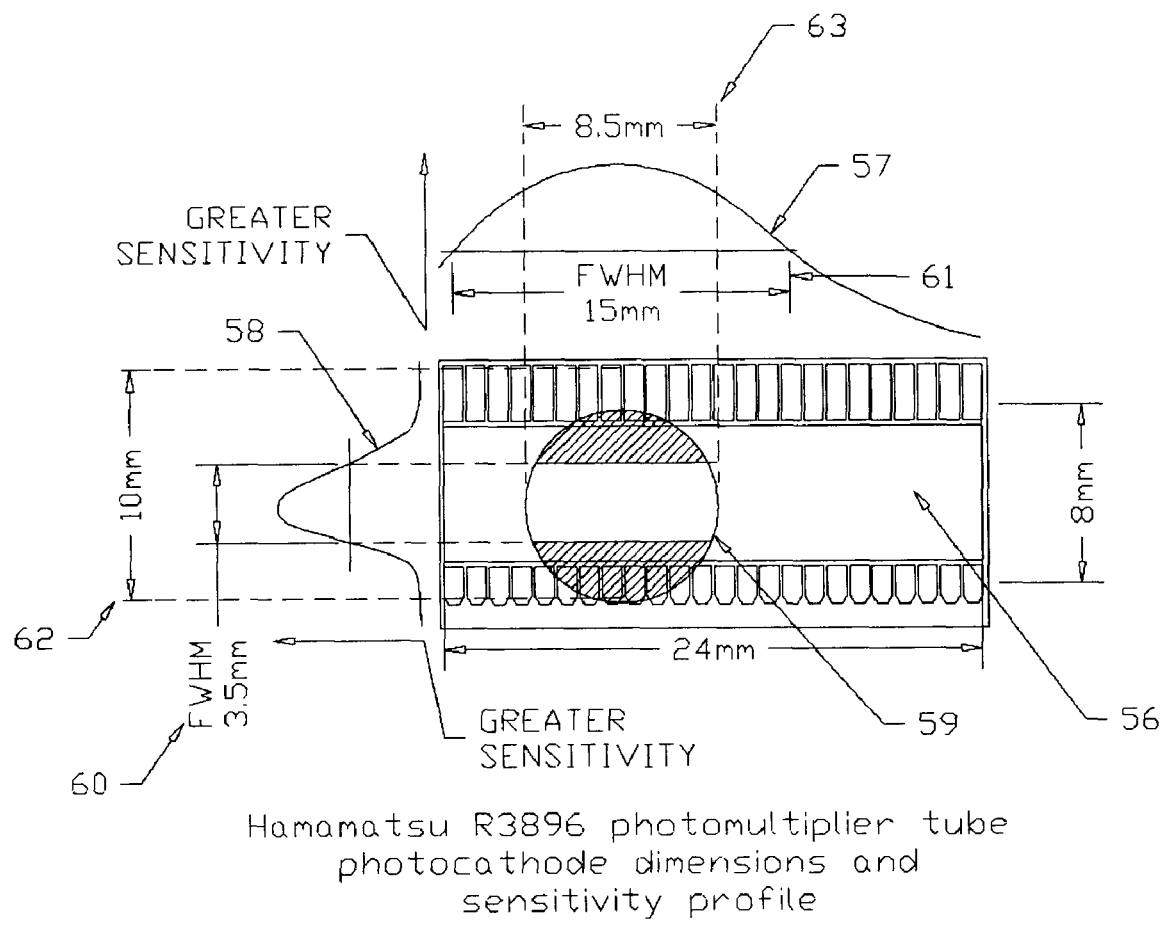
FIG. 9 shows a two-dimensional schematic diagram of the photocathode of a high performance and widely used commercial photo-detector: the Hamamatsu R3896 photomultiplier tube. Details of the variation in sensitivity in the X and Y directions are given. Superimposed on the photocathode schematic is a circle representing the demagnified image of the exit pupil of the objective lens depicted in FIG. 2.
Figure 21:
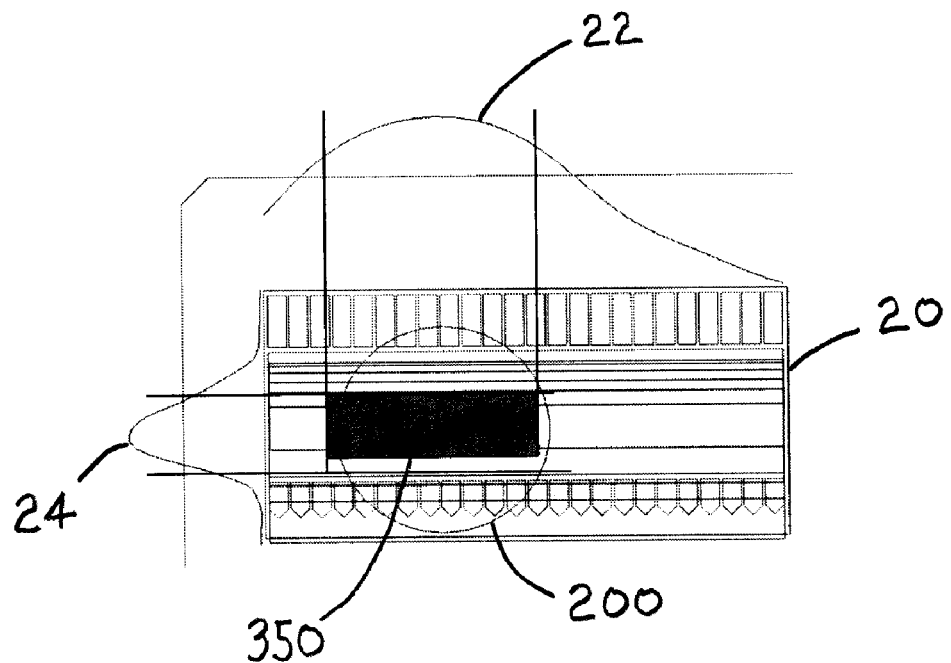
FIG. 21 is a schematic diagram of the detection window of the conventional, commercially available PMT (including graphs depicting the spatial sensitivity of the PMT in the X- and Y-axis) and having superimposed the rearranged image depicted in FIG. 20.

The cross-section of the image emanating from the exit pupil of objective lens 10 prior to division 200, and after division and superimposition using the device shown in FIGS. 18 and 19 is depicted schematically in FIG. 20. The cross-section of the original exit pupil image is represented by the circle 200. The mirrors 41, 42, 47 and 48 divide the original exit pupil image into four sections 310, 320, 330, and 340. These four independent sections of the original image are then superimposed upon each other (as described in the immediately preceding paragraph) to yield the superimposed image 350 as shown in FIG. 20. The superimposed image 350 is significantly smaller in cross-sectional area than the original exit pupil image 200. As shown in FIG. 21, when the superimposed image 350 is focused upon the detector window 20, it fits neatly within the sweet spot of the detector. As in FIG. 9, FIG. 21 depicts the detector window of the Hamamatsu R3896 PMT; the spatial sensitivities of the R3896 PMT in the X-axis (22) and the Y-axis (24) are also shown. As can be seen from FIG. 21, the superimposed image 350 falls entirely within the most sensitive portion of the detector. In contrast, the original de-magnified exit pupil image 200 extends well beyond the most sensitive regions of the detector window 20.

As noted earlier, the geometry into which the original exit pupil image is divided is unlimited. The original image may be split into any number of independent light paths, having any spatial geometry, without limitation. For example, in the same fashion as the version shown in FIGS. 20 and 21, FIG. 12, discussed earlier, shows another version of the invention in which the original exit pupil image is divided into four sections. But rather than the sections being parallel slices (as shown in FIGS. 29 and 21), the sections shown in FIG. 12 (410, 420, 430, and 440) are pie-shaped slices. The pie-shaped slices are created using a beam-splitter having triangular mirrors. In short, as shown in FIG. 12, the original exit pupil image 200 is divided into four (or more) triangular sections (410, 420, 430, and 440), which are then superimposed upon one another (as shown in the lower-left portion of FIG. 12) or processed independently of one another and directed to different devices (as shown in the lower-right portion of FIG. 12). This is accomplished using suitable pie-shaped mirrors in place of the rectangular mirrors 41, 42, 47 and 48 shown in FIGS. 19 and 20. Thus, as noted earlier, the apparatus is not limited to superimposing these "sub-sections". Each "sub-section" may be arranged in any pattern onto a single photodetector, or onto multiple photodetectors (or other optical or electro-optical device), as noted previously.

Figure 1:
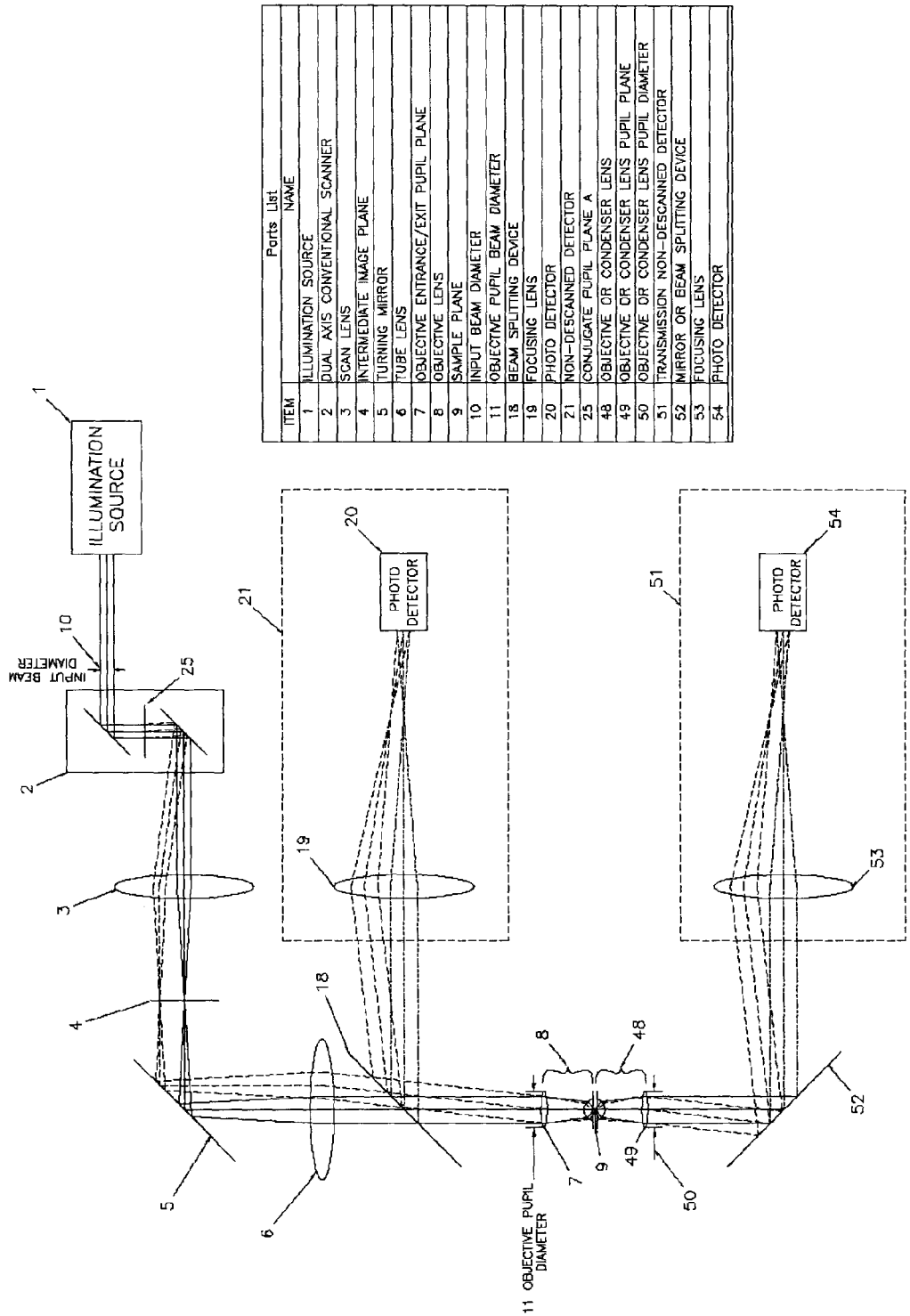
FIG. 1 is a two-dimensional schematic diagram of a conventional multiphoton detection and scan system including above- and below-sample non-descanned detectors.
Figure 2:
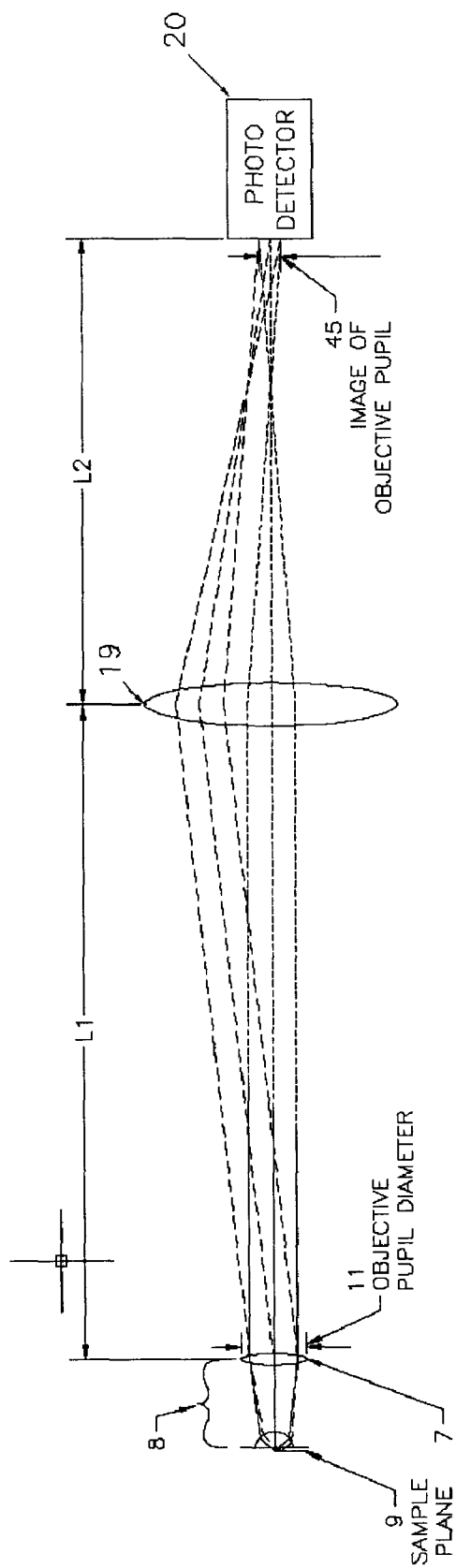
FIG. 2 is a two-dimensional schematic simplification of either of the detection pathways of the conventional multiphoton system shown in FIG. 1.
Figure 3:
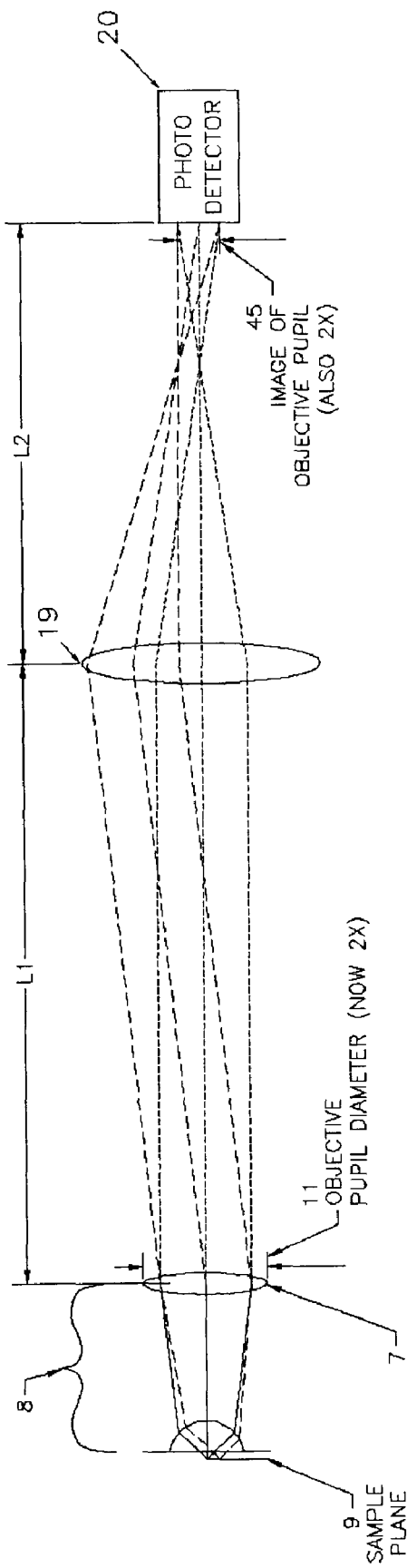
FIG. 3 is a two-dimensional schematic of the same detection path shown in FIG. 2 but with an objective lens whose pupil diameter is twice as large as the corresponding pupil diameter in FIG. 2.
Figure 4:
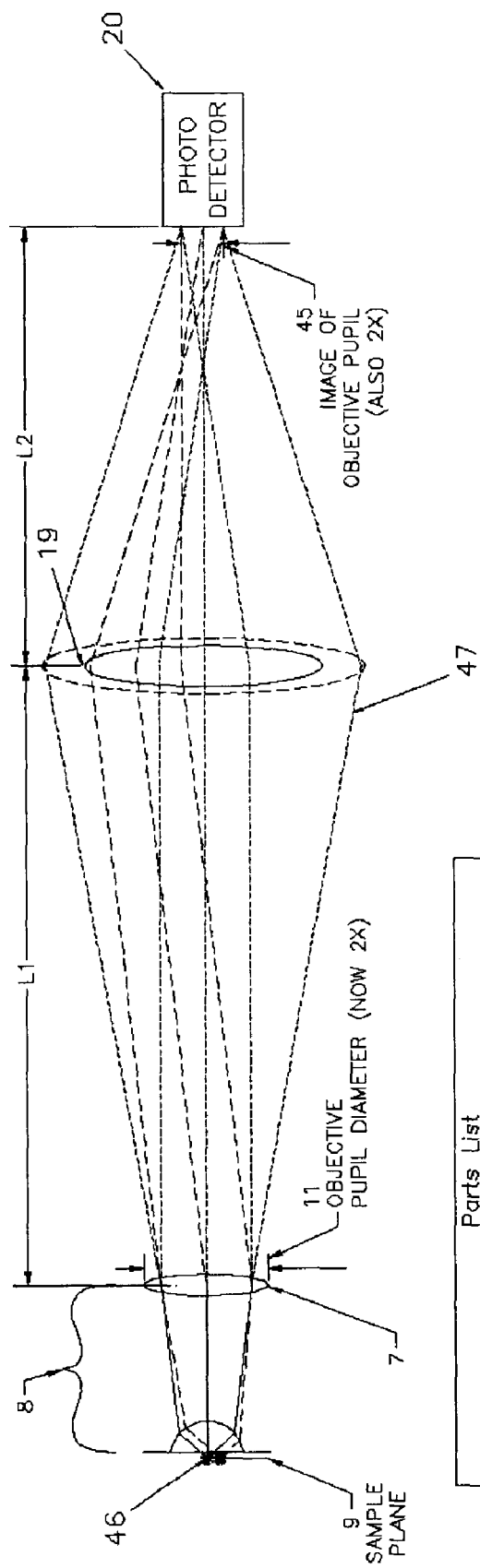
FIG. 4 is a two-dimensional schematic of the same detection path as shown in FIG. 2 with additional diagramming showing the broadened light cone which results from sample with greater light scattering properties.

FIG. 2 illustrates a conventional detection arrangement. This prior art arrangement is generally adequate when the device includes an objective lens pupil of from about 5 mm to about 8 mm in diameter. But as illustrated in FIGS. 3, 4, 5, and 6 (and discussed earlier), an impasse is encountered in trying to integrate a larger objective pupil with conventional, small-sized detectors. The return signal beam cannot be efficiently focused onto the sweet spot of the detector. As a result, conventional microscope designs that use an objective lens pupil having a diameter greater than about 8 mm in diameter are not achieving optimal performance. Image information is being lost because the full signal beam is not being detected by the photodetector.

FIGS. 20 and 21 demonstrate the primary utility and advantage of the present invention: it greatly improves the efficiency of detecting light emitted from a sample by rearranging, in piecewise fashion, the emitted signal onto the most sensitive area of a photodetector.

The conventional detection arrangement of FIG. 2 evolved in relation to the objective and optical components in use several years ago. In contrast, when using objective lenses with large back apertures (>about 8 mm, such as an Olympus 20×, 0.95 NA water immersion lens having a back aperture of 17.1 mm) and/or when visualizing highly scattering specimens, and/or performing deep tissue microscopy, the conventional detection system of FIG. 2 becomes a critical, detection-limiting concern. Scattering in the specimen translates into highly divergent, off-axis emission light exiting the objective pupil. Collecting and concentrating this widely divergent light from increasingly large back aperture objective lenses requires extraordinary optical designs. The "best case" result of using the conventional detection arrangement of FIG. 2 in this wide-angle collection situation is indicated by the circle 200 in FIG. 21. A very significant amount of the emitted signal falls outside the sweet spot of the photodetector or misses the active window of the photodetector entirely.

As conditions become more challenging at the sample (e.g., deeper imaging and greater scattering), more and more of the scattered fluorescent energy falls at or beyond the boundary indicated by the circle 200 in FIG. 21. This scattered energy is lost or poorly detected, making its contribution unavailable to the rastered image. The present invention, however, captures this scattered light energy and repositions it onto the most sensitive area of the photodetector. Thus, a far greater amount of the emission coming from the sample is detected efficiently and contributes to the corresponding image.

Therefore another utility of the present invention is that it provides an apparatus to capture and distribute in a piecewise manner the widely divergent signal light from large apertures in a way that best suits smaller photodetectors. By dividing the work of transmitting the piecewise pupil images to the photodetector or detectors among several lenses, each lens (or optical element) in the relay require less curvature (or less power), thereby further reducing aberrations that contribute to light loss at the detector. Using lenses with less curvature, and which are therefore working at lower angles of incidence with the signal light, reduces Fresnel reflection losses that occur when anti-reflection coatings operate at angles of incidence outside their design range.

Additionally, by using a moderate focal length projector 30 (shown as a lens in FIG. 22) to project an image of the objective pupil to a distant plane, the beam diameter (prior to division) converges to a diameter where a beam splitter (spectral or otherwise) of economic and practical size can be inserted in the path for division of the beam to multiple channels. This version of the invention is shown schematically in FIG. 22. The device depicted in FIG. 22 includes two channels, each having a pupil division and parallel rearrangement/superimposition device as depicted in FIGS. 15 and 16. Thus, the first channel includes beam-splitting mirrors 41 and 42, directing mirrors 43 and 44, focusing lenses 45 and 46, and detector 100. Likewise, the second channel includes beam-splitting mirrors 41' and 42', directing mirrors 43' and 44', focusing lenses 45' and 46', and detector 100. A beam-splitter 110 is disposed in the light path after the light has exited lens 30, but prior to impinging on any of mirrors 41, 41', 42, and 42'. The beam-splitter 110 can be of any design now known or developed in the future for splitting a beam of light into two independent beams, e.g., half-silvered mirrors, dichroic mirrors, non-polarizing prisms, polarizing prisms (such as a Wollaston prism), beam-splitting cubes of any description, and the like.

Figure 22:
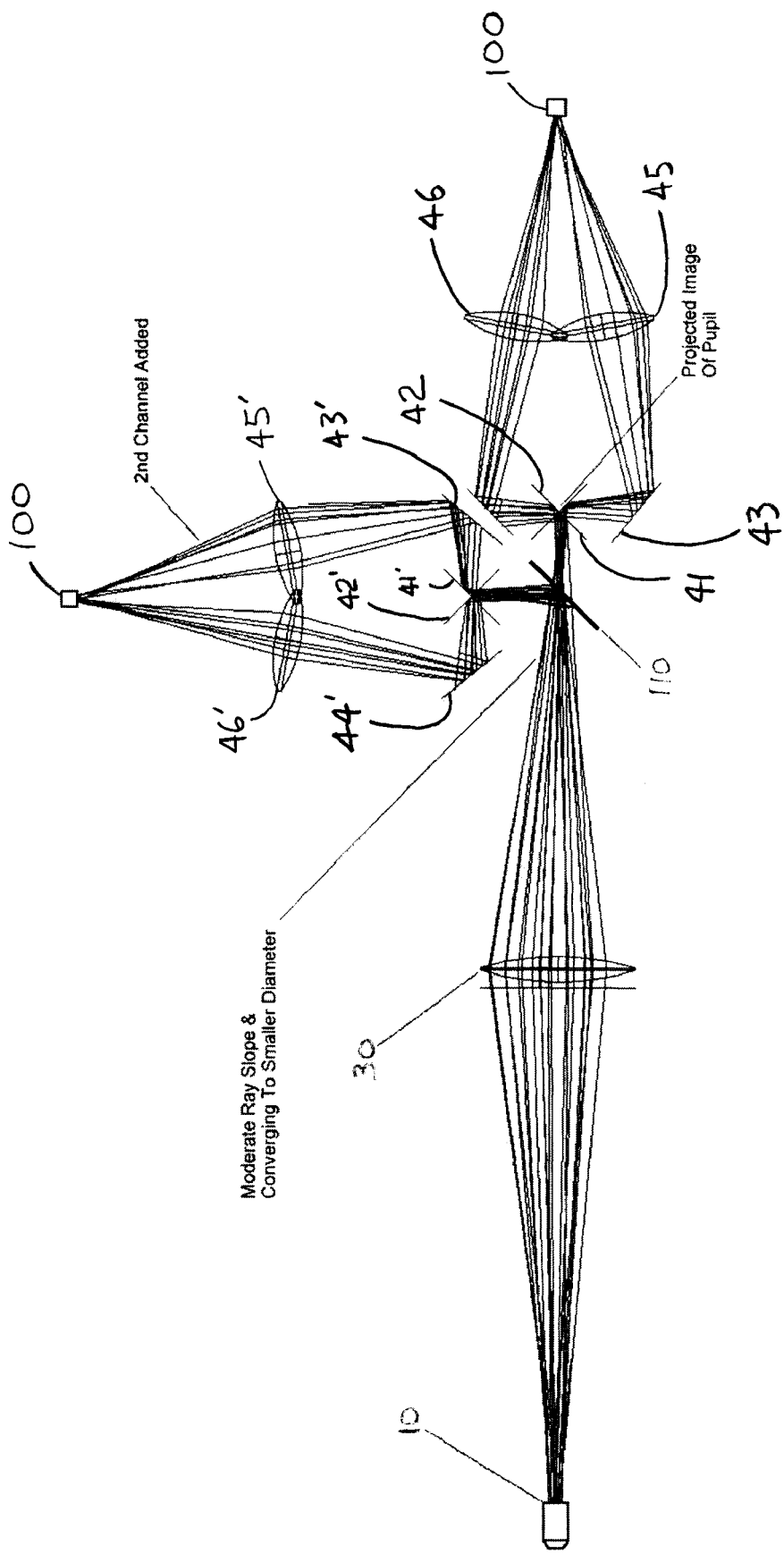
FIG. 22 is a schematic diagram depicting another version of the present invention and illustrating how the invention creates an advantageous location for inserting a beam splitter to split the original signal into two separate channels.

A distinct advantage gained with the version of the invention depicted in FIG. 22 is that a position is generated in which dichroics, polychroics, and beam-splitters 110 can be inserted into the light path and still operate at moderate angles if incidence. Often these devices (the dichroics, polychroics, and beam-splitters 110) have significant angle variation-sensitivity, which makes them unsuitable for use in situations where the angles of incidence are wide (and widely varied). Using the moderate power relay lens 30 to re-image the pupil makes it possible to reduce, or otherwise to tailor, the range of angles at which the light beam will impinge upon the beam splitter.

Another distinct advantage of the present invention is that the device can be specifically tailored to optimize the performance of any given type or make of photodetector. Any given type or make of photodetector will have its own characteristic sensitivity profile. The optical characteristics of the objective lens and the cooperating pupil division and parallel rearrangement apparatus of the present invention can therefore be custom matched to the sensitivity profile of the specific photo-detector used in the system. In this fashion, the superimposed image generated by the parallel rearrangement and superimposition of the light path is focused entirely (or substantially entirely) within the sweet spot of the photodetector used.

Figure 23:
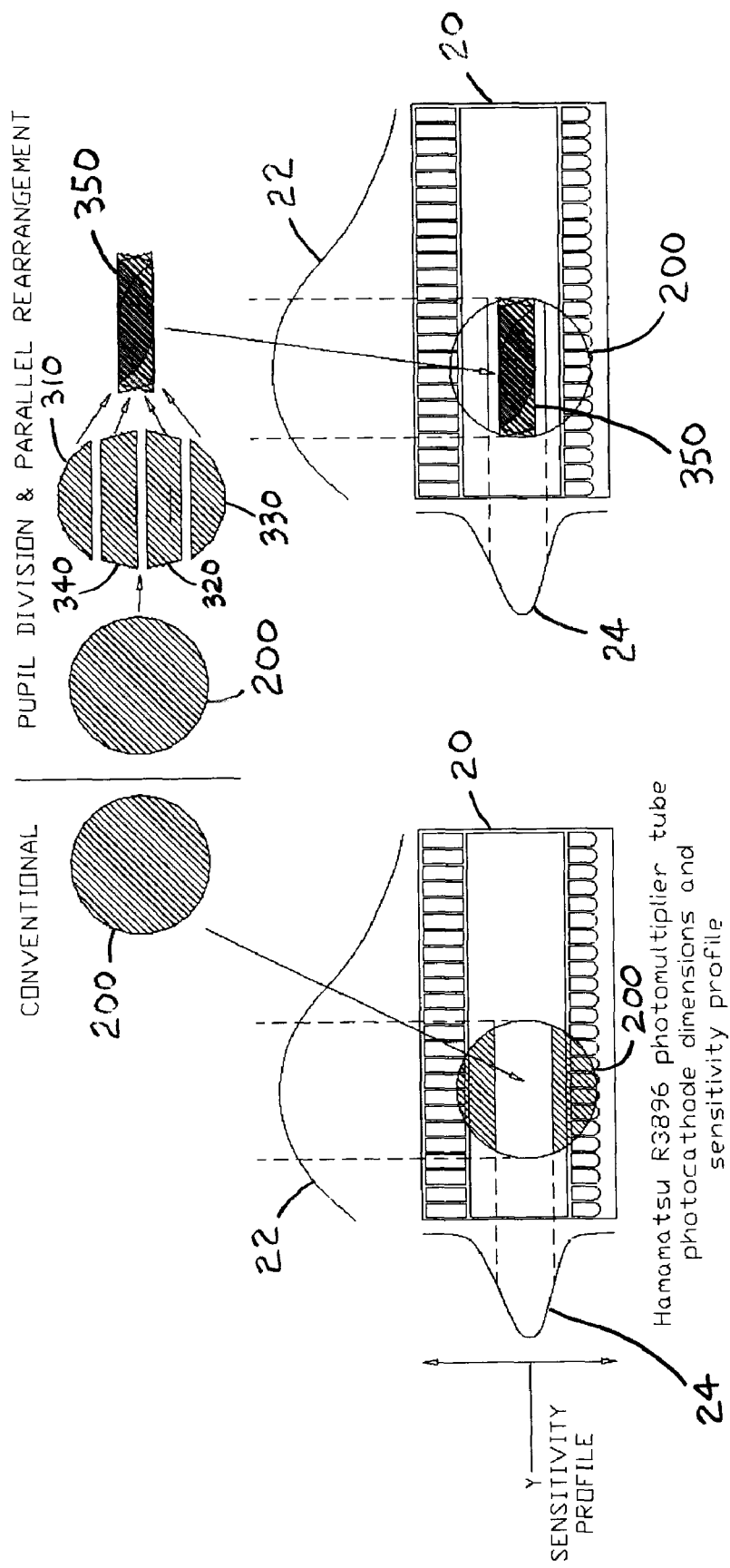
FIG. 23 is a schematic diagram to illustrate the mathematical description of dividing the source object light into four sub-sections and rearranging those four sub-sections onto the detection window of the R3896 PMT and showing the detection efficiency improvement as compared to conventional designs.

A comparison of the detection efficiency improvement of the PDPR design can be accomplished using a reasonably straightforward set of calculations, an example of which follows. FIG. 23 gives a schematic representation of this operation. In this set of calculations, the Hamamatsu-brand R3896 PMT is used as the model photodetector. This choice of PMT as the model is appropriate because the R3896 PMT is a very common commercial PMT which is used in a host of microscopes and spectrometers for detection of light in the range of 185 to 900 nm. The method of calculation involves convolving a simple mathematical model of the ideal objective pupil image—first with a perfect detector, then with the R3896 detector profile, and finally convolution of the pupil division and parallel rearrangement (PDPR) pupil image with the R3896 detector profile.

The calculation is for a uniform circular light path exiting a 20×, 0.95 NA, 17.1 mm back aperture objective lens wherein:

r is the radius of the pupil image at the photocathode;
$\omega$ is a width parameter to model the vertical (Y) sensitivity profile where it falls to $1/e^2$;
$s_o$ is the photocathode on-axis peak sensitivity;
$s_{(r)}$ is the photocathode sensitivity at a distance r from the pupil image center;
r=0.5 is the sensitivity profile width at $1/e^2$ points;
$\omega$=0.287 is the sensitivity profile width at $1/e^2$ points;
$s_0$=1.0 normalize the sensitivity profile to 1 (100%); and
d=range is the chord at distance "r" from pupil image center.

Formula to find chord length at distance d from beam center:

$$c(d)=2\cdot\sqrt{(r-|d|)\cdot|2\cdot r-(r-|d|)|}.$$

Conditional formula to normalize chord length and discard points outside photocathode:

$$c_n(d)=\text{if}\,(|d|\leq r, c(d)/r\cdot 2, 0).$$

Gaussian function to approximate the sensitivity profile of the 3896 photocathode:

$$s(r)=s_0\cdot e^{-2\cdot r^2/\omega^2}.$$

Calculate the signal detected by the PDPR design by convolution using four (4) rectangular repositioned sections of the pupil image centered on the sensitivity profile of the R3896 PMT photocathode:

$$pdprd=(\int_0^{0.25}s(r-0.125)\cdot c_n(r)dr)+(\int_{-0.25}^{0}s(r+0.125)\cdot c_n(r)dr)+(\int_{0.25}^{0.5}s(r-0.375)\cdot c_n(r)dr)+(\int_{-0.5}^{-0.25}s(r+0.375)*c_n(r)dr)$$

$$pdprd=0.562\ pdprd/perfectd=71.55\%$$

The PDPR design of the present invention is over 70% efficient.

To find the maximum detectable signal (given a perfect detector with a sensitivity of 1 and no spatial variation), if the photocathode is uniformly sensitive at 100%, the total detected energy is proportional to the area of the pupil image, which is of unit diameter.

$$\text{perfect}d = \int_{-0.5}^{0.5} c_n(r)dr \quad \text{perfect}d = 0.785.$$

Here, the maximum detectable signal for a perfect detector is 78.5%.

To find the signal detected by the conventional design, use convolution of a uniform circular 20×/0.95 NA pupil image across the R3896 sensitivity profile:

$$\text{conventional}d = \int_{-0.5}^{0.5} s(r) \cdot c_n(r)dr \quad \text{conventional}d = 0.344$$

$$\text{conventional}d/\text{perfect}d = 43.754\%.$$

The conventional design is less than 45% efficient.

What is claimed is:

1. An apparatus for dividing and rearranging a light beam, the apparatus comprising:
a first beam splitter configured to split the light beam into at least two independent light paths to yield at least a first light path and a second light path;
a first beam focuser configured to direct and focus the first light path onto a first position in a first focal plane;
a second beam focuser configured to direct and focus the second light path onto a second position in a second focal plane, wherein the second position and the second focal plane are the same as, or different from, the first position and the first focal plane, respectively;
an objective lens configured to direct the light beam to the first beam splitter, and a projector disposed between the first beam splitter and the objective; and
a translator mechanism dimensioned and configured to translate independently the objective lens, the projector, or both.

2. An apparatus for dividing and rearranging a light beam, the apparatus comprising:
a first beam splitter configured to split the light beam into at least two independent light paths to yield at least a first light path and a second light path;
a first beam focuser configured to direct and focus the first light path onto a first position in a first focal plane;
a second beam focuser configured to direct and focus the second light path onto a second position in a second focal plane, wherein the second position and the second focal plane are the same as, or different from, the first position and the first focal plane, respectively;
an objective lens configured to direct the light beam to the first beam splitter, and a projector disposed between the first beam splitter and the objective; and
at least one photodetector configured to detect the first light path and the second light path.

3. The apparatus of claim 2, further comprising a translator mechanism dimensioned and configured to translate the photodetector.

4. An apparatus for dividing and rearranging a light beam, the apparatus comprising:
a first beam splitter configured to split the light beam into at least two independent light paths to yield at least a first light path and a second light path;
a first beam focuser configured to direct and focus the first light path onto a first position in a first focal plane;
a second beam focuser configured to direct and focus the second light path onto a second position in a second focal plane, wherein the second position and the second focal plane are the same as, or different from, the first position and the first focal plane, respectively; and
an objective lens configured to direct the light beam to the first beam splitter, and a projector disposed between the first beam splitter and the objective, at least one photodetector configured to detect the first light path and the second light path, and a translator mechanism dimensioned and configured to translate independently the objective lens, the projector, and the photodetector.

5. An apparatus for dividing and rearranging a light beam, the apparatus comprising:
a first beam splitter configured to split the light beam into at least two independent light paths to yield at least a first light path and a second light path;
a first beam focuser configured to direct and focus the first light path onto a first position in a first focal plane;
a second beam focuser configured to direct and focus the second light path onto a second position in a second focal plane, wherein the second position and the second focal plane are the same as, or different from, the first position and the first focal plane, respectively;
wherein the first beam splitter is configured to split the light beam into at least four independent light paths to yield at least the first light path, the second light path, a third light path, and a fourth light path;
a third beam focuser configured to focus the third light path onto a third position in a third focal plane;
a fourth beam focuser configured to focus the fourth light path onto a fourth position in a fourth focal plane;
wherein the first, second, third, and fourth positions and the first, second, third, and fourth focal planes are the same as, or different from, one another, respectively; and
an objective lens configured to direct the light beam to the first beam splitter, and a projector disposed between the first beam splitter and the objective.

6. The apparatus of claim 5, further comprising a translator mechanism dimensioned and configured to translate independently the objective lens, the projector, or both.

7. The apparatus of claim 5, further comprising at least one photodetector configured to detect the first, second, third, and fourth light paths.

8. The apparatus of claim 7, further comprising a translator mechanism dimensioned and configured to translate the photodetector.

9. An apparatus for dividing and rearranging a light beam, the apparatus comprising:
a first beam splitter configured to split the light beam into at least two independent light paths to yield at least a first light path and a second light path;
a first beam focuser configured to direct and focus the first light path onto a first position in a first focal plane;
a second beam focuser configured to direct and focus the second light path onto a second position in a second focal plane, wherein the second position and the second focal plane are the same as, or different from, the first position and the first focal plane, respectively;
wherein the first beam splitter is configured to split the light beam into at least four independent light paths to yield at least the first light path, the second light path, a third light path, and a fourth light path;
a third beam focuser configured to focus the third light path onto a third position in a third focal plane;
a fourth beam focuser configured to focus the fourth light path onto a fourth position in a fourth focal plane;
wherein the first, second, third, and fourth positions and the first, second, third, and fourth focal planes are the same as, or different from, one another, respectively; and
an objective lens configured to direct the light beam to the first beam splitter, and a projector disposed between the first beam splitter and the objective, at least one photodetector configured to detect the first, second, third, and fourth light paths, and a translator mechanism dimensioned and configured to translate independently the objective lens, the projector, and the photodetector.

10. An apparatus for dividing and rearranging a light beam, the apparatus comprising:
   a first beam splitter configured to split the light beam into at least two independent light paths to yield at least a first light path and a second light path;
   a first beam focuser configured to direct and focus the first light path onto a first position in a first focal plane;
   a second beam focuser configured to direct and focus the second light path onto a second position in a second focal plane, wherein the second position and the second focal plane are the same as, or different from, the first position and the first focal plane, respectively; and
   a second beam splitter disposed in the light beam at a point upstream from the first beam splitter, wherein the second beam splitter is configured to split the light beam into light path 1' and light path 2', and wherein light path 1' is directed toward the first beam splitter;
   and further comprising a third beam splitter configured to split light path 2' into at least two independent light paths to yield at least a third light path and a fourth light path;
   a third beam focuser configured to focus the third light path onto a third position in a third focal plane; and
   a fourth beam focuser configured to focus the fourth light path onto a fourth position in a fourth focal plane; and
   wherein the first, second, third, and fourth positions and the first, second, third, and fourth focal planes are the same as, or different from, one another, respectively.

* * * * *